United States Patent
Jones et al.

(10) Patent No.: US 9,854,816 B1
(45) Date of Patent: Jan. 2, 2018

(54) CUSHION MOUNT FOR STUNNER

(71) Applicant: Jarvis Products Corporation, Middletown, CT (US)

(72) Inventors: Arthur Jones, Tabor, IA (US); Trent Jones, Tabor, IA (US)

(73) Assignee: Jarvis Products Corporation, Middletown, CT (US)

( * ) Notice: Subject to any disclaimer, the term of this patent is extended or adjusted under 35 U.S.C. 154(b) by 0 days.

(21) Appl. No.: 15/637,587

(22) Filed: Jun. 29, 2017

Related U.S. Application Data

(63) Continuation of application No. 15/422,885, filed on Feb. 2, 2017, now Pat. No. 9,687,003, which is a continuation of application No. 15/254,546, filed on Sep. 1, 2016, now Pat. No. 9,743,678, which is a continuation of application No. 15/211,524, filed on Jul. 15, 2016, now Pat. No. 9,661,859.

(60) Provisional application No. 62/357,566, filed on Jul. 1, 2016.

(51) Int. Cl.
*A22B 3/00* (2006.01)
*A22B 3/02* (2006.01)
*A22B 3/10* (2006.01)

(52) U.S. Cl.
CPC . *A22B 3/02* (2013.01); *A22B 3/10* (2013.01)

(58) Field of Classification Search
CPC .................................. A22B 3/00; A22B 3/02
USPC ............................................. 452/57, 61, 62
See application file for complete search history.

(56) References Cited

U.S. PATENT DOCUMENTS

| | | | | |
|---|---|---|---|---|
| 4,219,905 A * | 9/1980 | Thacker | ............... | A22B 3/02 452/57 |
| 4,446,599 A * | 5/1984 | Karubian | ............... | A22B 3/02 452/62 |
| 4,503,585 A * | 3/1985 | Hamel | ............... | A22B 3/02 227/130 |
| 4,575,900 A * | 3/1986 | Hamel | ............... | A22B 3/02 227/130 |
| 4,625,442 A * | 12/1986 | Hill | ............... | A22B 3/02 227/10 |
| 4,757,627 A * | 7/1988 | Saligari | ............... | A22B 3/02 42/1.12 |
| 5,692,951 A * | 12/1997 | Huff | ............... | A22B 3/02 452/57 |
| 6,135,871 A | 10/2000 | Jones | | |

(Continued)

*Primary Examiner* — Richard Price, Jr.
(74) *Attorney, Agent, or Firm* — DeLio, Peterson & Curcio; Peter W. Peterson

(57) ABSTRACT

An animal stunner for use in livestock/slaughterhouse operations has a piston slideable within an inner chamber, and a fire pressure chamber with an annular configuration disposed adjacent the rearward or central end of the inner chamber. A stunning rod is driven forward by the piston to stun the animal and rearward to retract the rod. A valve system alternately controls flow of the pressurized fluid from the fire pressure chamber to the rearward end of the inner chamber to move the piston and drive the stunning rod. A catch system holds and releases the stunning rod. A compressed fluid supply is used to retract the stunning rod between operation cycles. Handles employing triggers are used by the operator to hold the stunner and to activate the valve system, and cushion mount systems are attached between the handles and stunner housing to absorb shock while operating the stunner.

34 Claims, 35 Drawing Sheets

(56) References Cited

U.S. PATENT DOCUMENTS

| | | | |
|---|---|---|---|
| 6,170,477 B1 * | 1/2001 | Horlock | F41B 11/83 124/61 |
| 9,044,028 B2 | 6/2015 | Evans | |
| 2004/0209562 A1 | 10/2004 | Jones | |

* cited by examiner

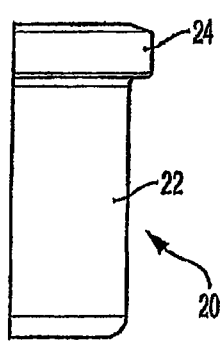
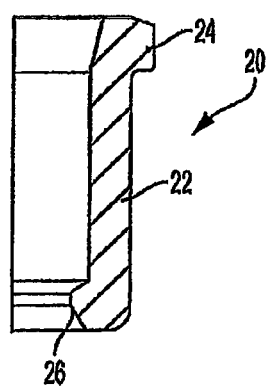
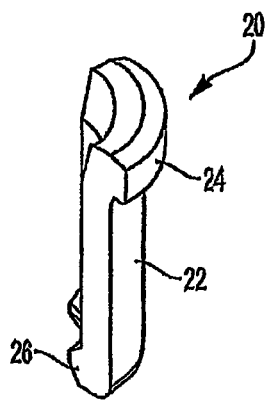
FIG. 14        FIG. 15        FIG. 16
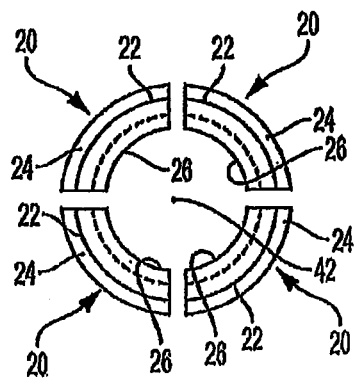
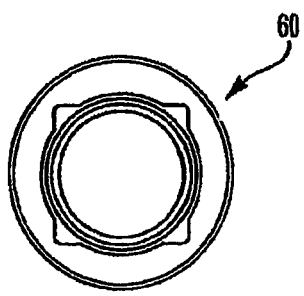
FIG. 17        FIG. 18
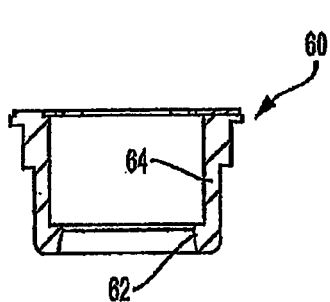
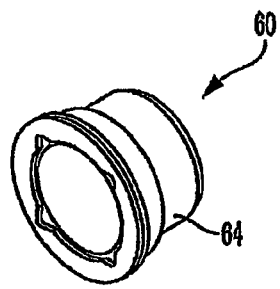
FIG. 19        FIG. 20

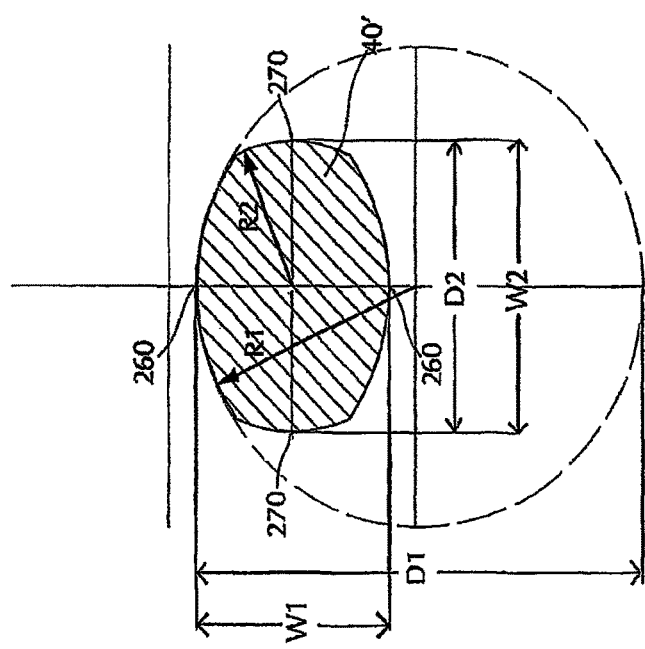
Fig. 32
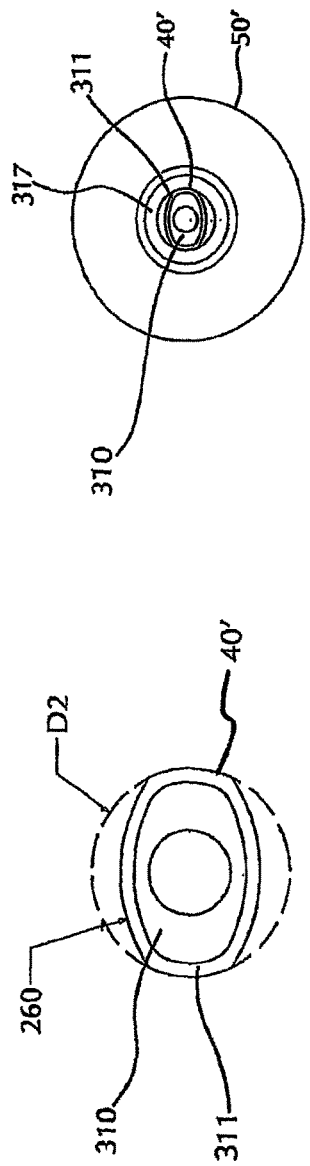
Fig. 34
Fig. 33

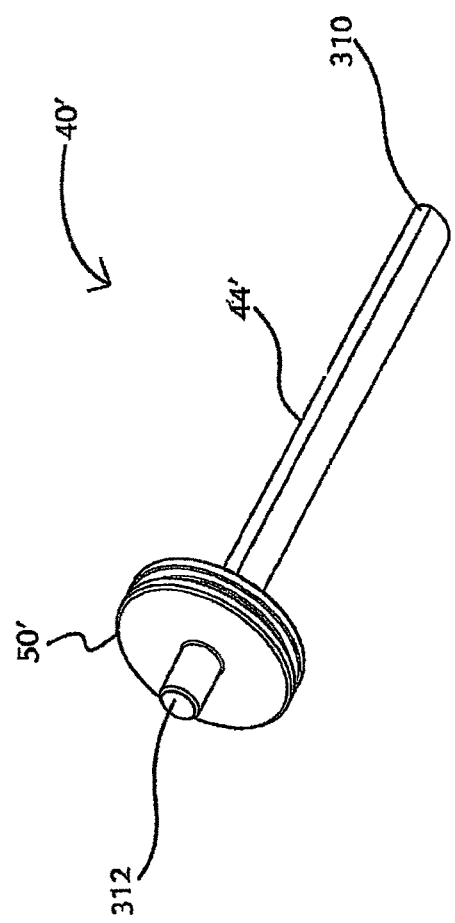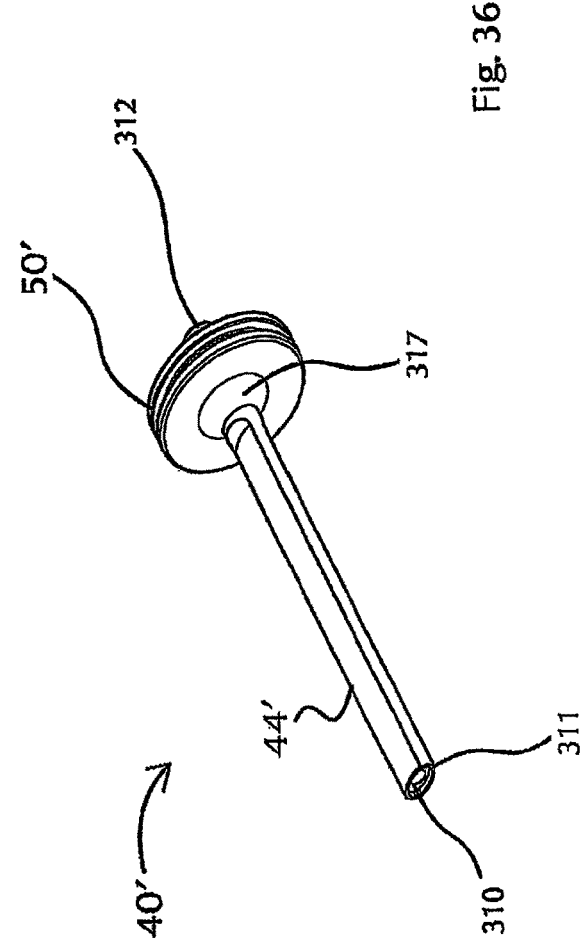

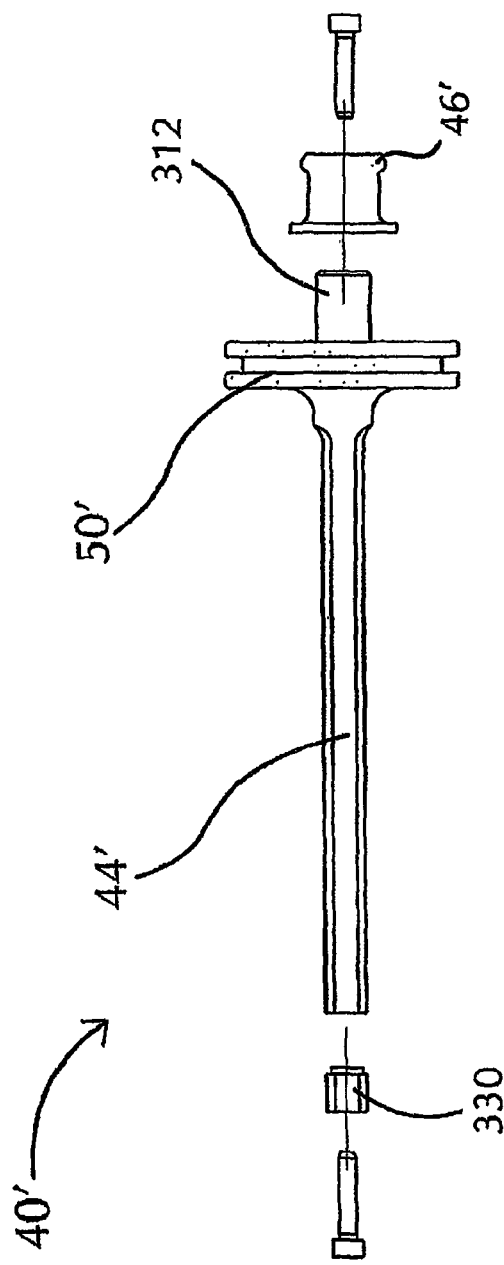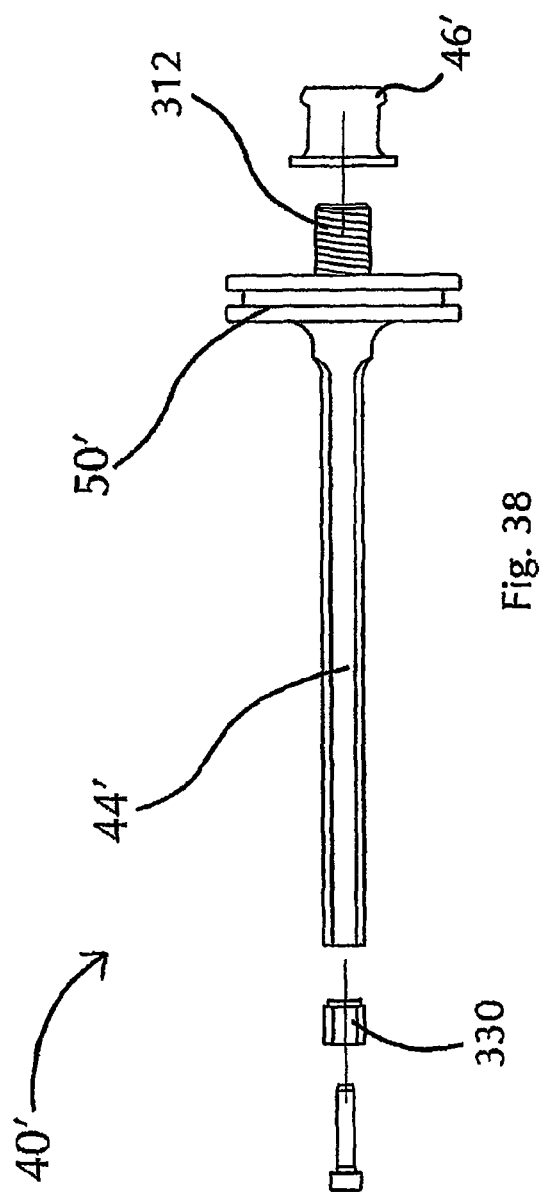
Fig. 37
Fig. 38

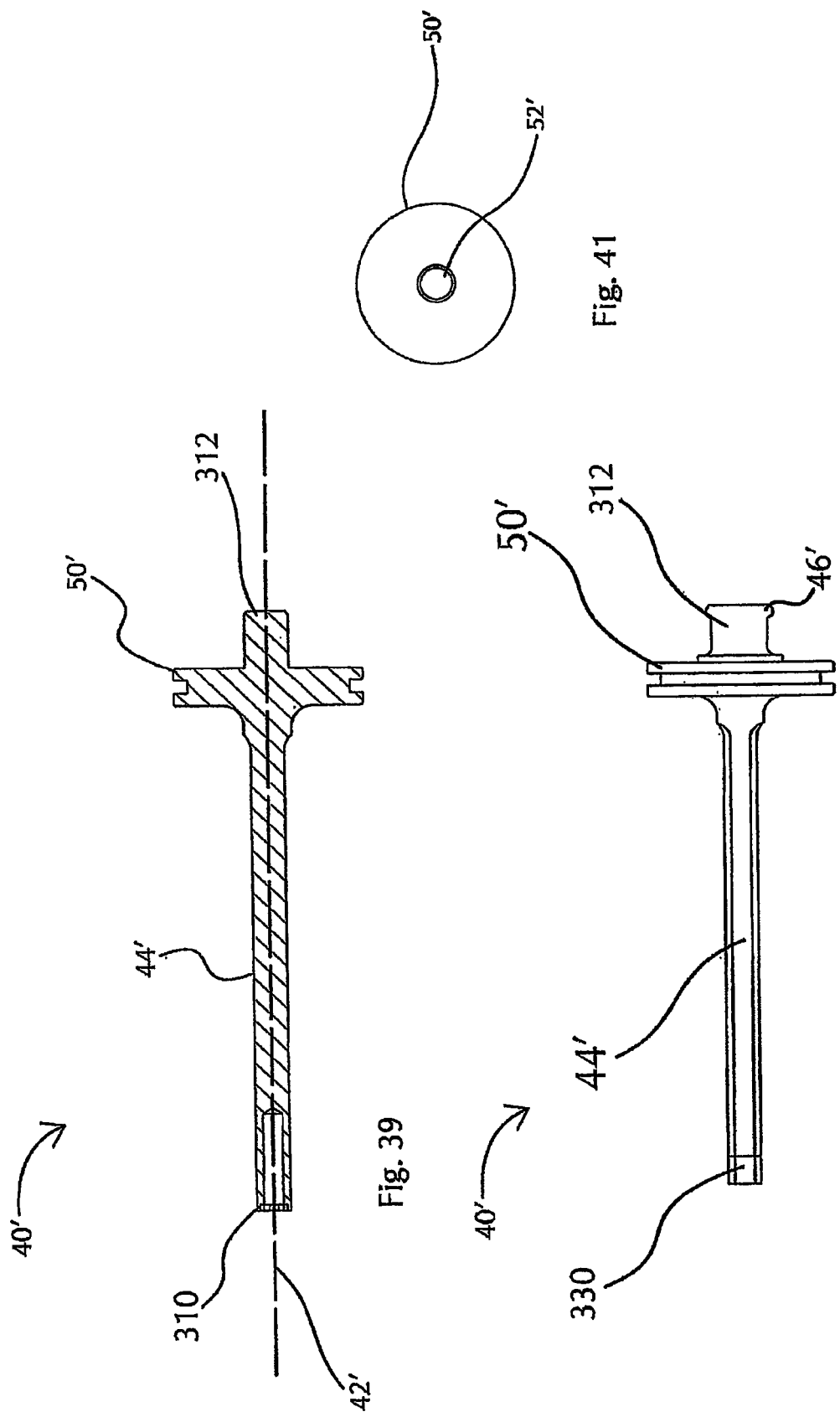

Section A-A

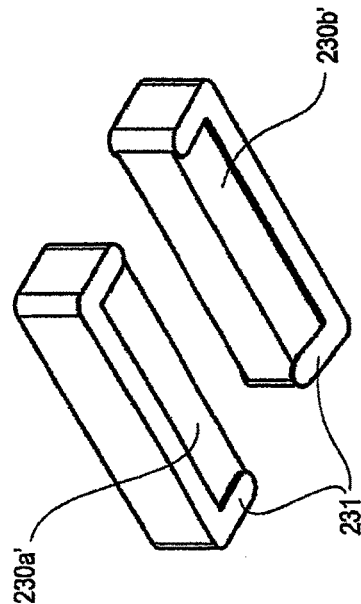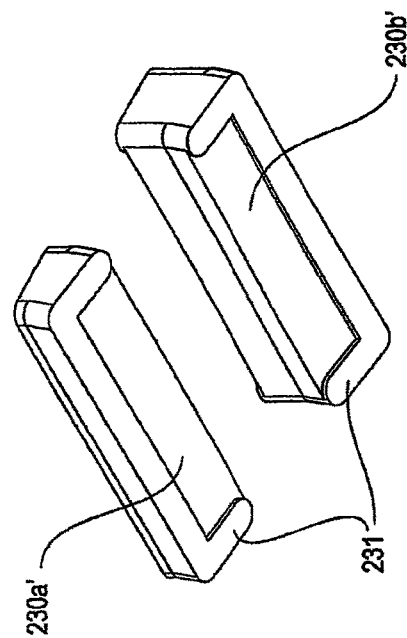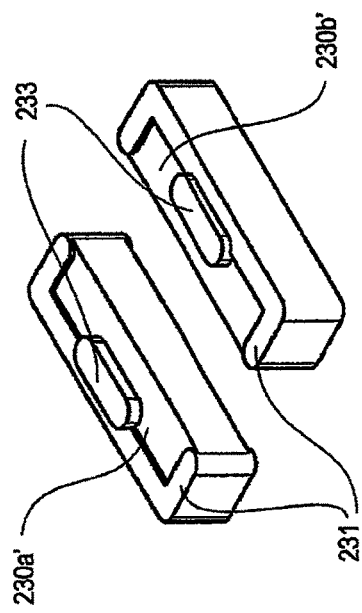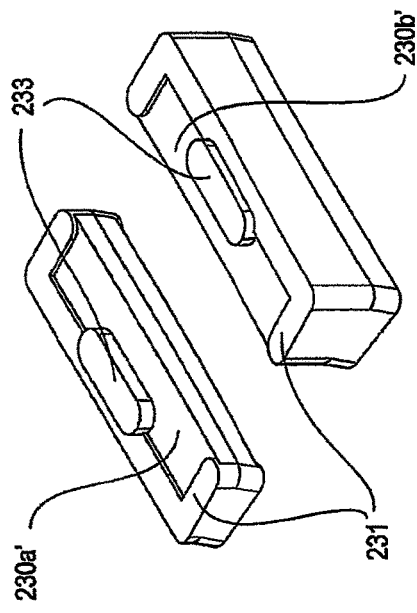
Fig. 58
Fig. 59
Fig. 60
Fig. 61

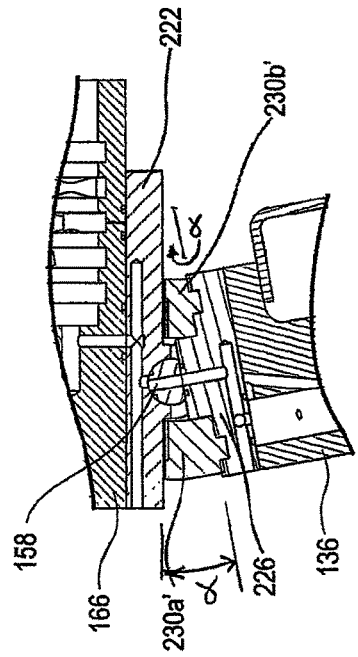
Fig. 63
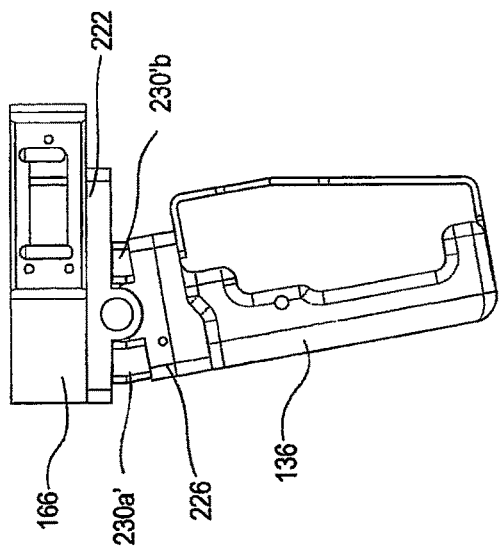
Fig. 62
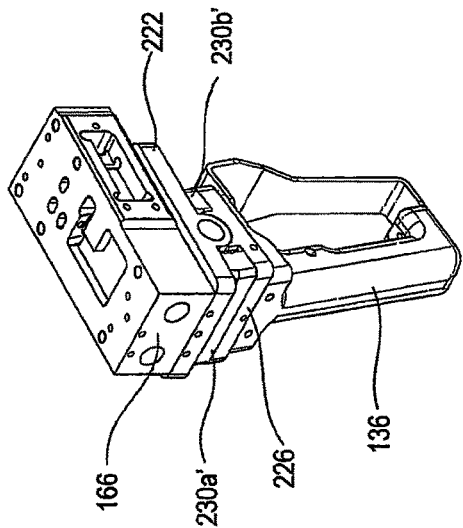
Fig. 65
Fig. 64

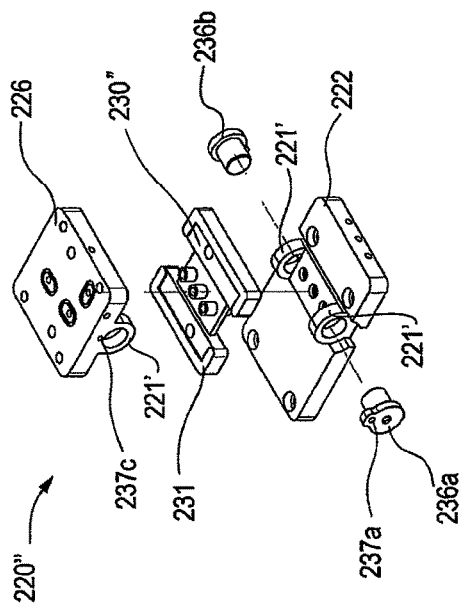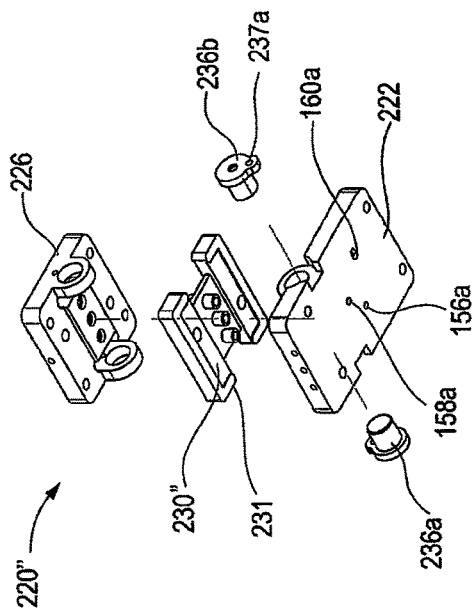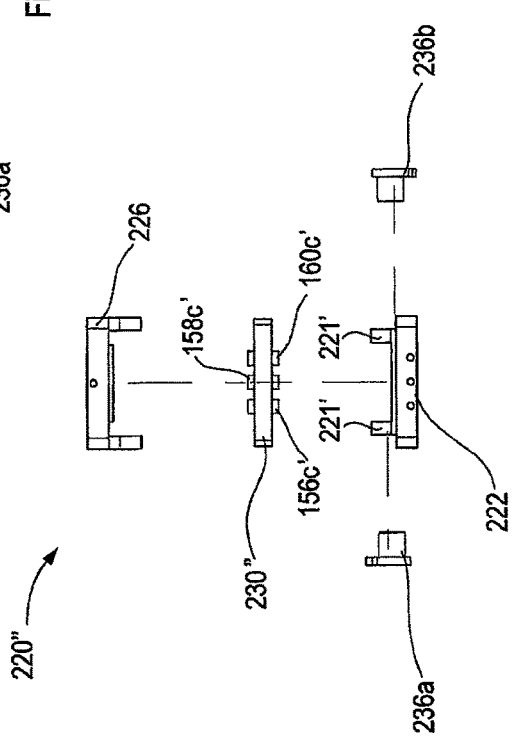

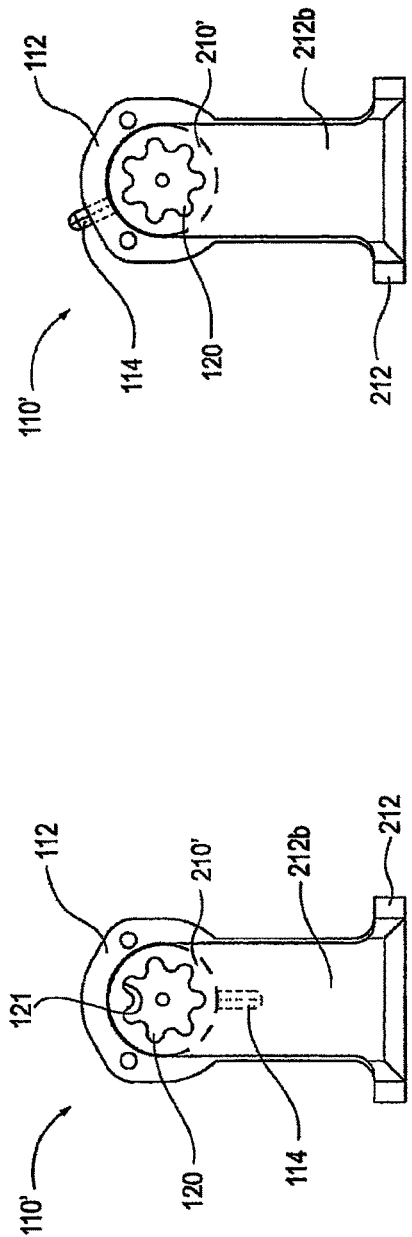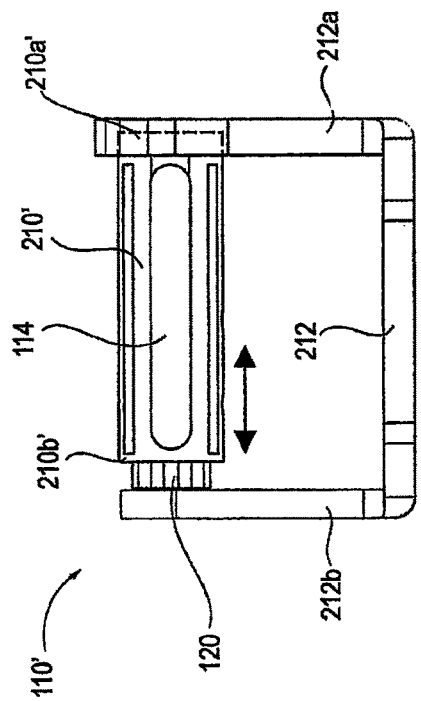

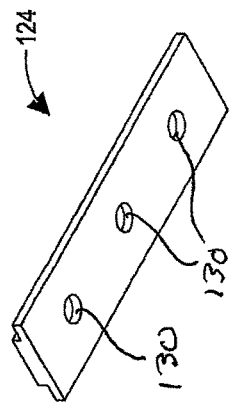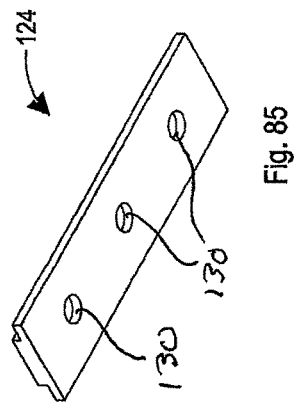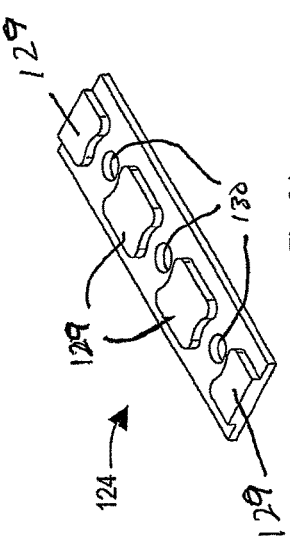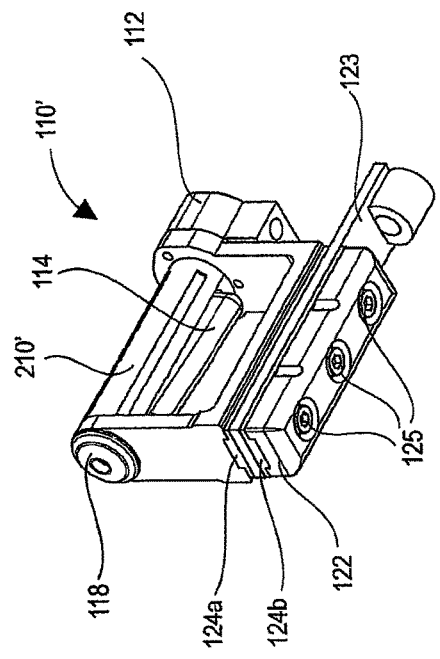

CUSHION MOUNT FOR STUNNER

This application claims priority to U.S. provisional patent application No. 62/357,566 filed on Jul. 1, 2016, U.S. provisional patent application No. 62/453,579 filed on Feb. 2, 2017, and U.S. non-provisional patent application Ser. No. 15/254,546 filed on Sep. 1, 2016.

BACKGROUND OF THE INVENTION

1. Field of the Invention

This invention relates in general to a pneumatic animal stunner for use in livestock/slaughterhouse operations and more specifically to the stunning rod used to stun the animal, the catch system for holding and releasing the stunning rod, the compressed air supply used to retract the stunning rod between operation cycles, and the handles used by the operator to hold the stunner.

2. Description of Related Art

In livestock production plants, it is important to stun and disable an animal for processing. Although numerous methods have been used to stun livestock, captive bolt mechanisms have proven to be the most efficient, inexpensive, and humane way to disable the animal. Particularly, pneumatic captive bolt devices have been used in this capacity.

U.S. Pat. No. 6,135,871 and U.S. Patent Publication No. 2004/0209562, the disclosures of which are hereby incorporated by reference, disclose pneumatic animal stunners that, among other things, include a physical catch for the piston that drives the stunning rod.

FIGS. 1 and 2 show a prior art catch arrangement for a stunner in which stunning rod 1 extending rightward (forward) from a piston 2 has a leftward (rearward) end with outwardly extending lips 3 that may be alternately held and released by inward extending lips at the end portion 4a of a catch 4. At a central portion of the body of catch 4 is an inwardly extending flange 4b which is pivotable about an outwardly extending flange 6a of catch pivot post 6. A catch piston 5 includes an inner bore 5a at a forward end, an inner bore 5c at a rearward end, and a relief portion 5b between the two. In the hold position of FIG. 1, the catch piston 5 is slid longitudinally rearward so that forward inner bore 5a contacts moves catch forward end 4a toward and into engagement with stunning rod lips 3, at the same time that rearward inner bore 5c contacts the outer surface of catch rearward end 4c. In the release position of FIG. 2, the catch piston 5 is slid longitudinally forward so that forward inner bore 5a moves forward of catch forward end 4a, and the relief portion 5b permits catch forward end 4a to move outward and out of engagement with stunning rod lips 3 as the flange 4b of catch 4 pivots about catch post pivot flange 6a. At the same time, catch piston rearward inner bore 5c slides forward and then moves out of contact with the outer surface of catch rearward end 4c. Upon release of the stunning rod lips, compressed air behind piston 2 moves stunning rod 1 forward to stun the animal.

The catch and other components of such prior designs function well, but in operation some of its components are subject to sliding engagement with other components, and therefore interference and/or wear, which causes drag and/or requires periodic replacement of such components. The stunning rod is also subject to rotation during usage.

Compressed air usage by prior art stunners is also an issue, since excess air volume needed for each stunner cycle increases costs of operation. Additionally, the operator is subject to fatigue when using the stunner repeatedly, due to the shock of the stunning rod projection and retraction in each operation cycle.

SUMMARY OF THE INVENTION

Bearing in mind the problems and deficiencies of the prior art, it is therefore an object of the present invention to provide an animal stunner having a release system which reduces wear of the moving parts controlling the operation of the animal stunner.

It is another object of the present invention to provide an animal stunner having reduced drag on movement between the catch and catch piston during operation.

A further object of the invention is to provide an animal stunner having reduced wear on the catch and catch piston as a result of repeated operation and reduced premature failure.

It is yet another object of the present invention to provide an animal stunner having more reliable stunning due to a stronger and improved catch system.

Yet a further object of the present invention is to provide an animal stunner having improved operator safety as a result of a stronger catch system.

Another object of the present invention is to provide an animal stunner having lower compressed air usage between each stunner cycle.

A further object of the invention is to provide an animal stunner having improved operator comfort and reduction of possible injury.

Yet another object of the present invention is to provide an animal stunner in which the stunning rod slides easily and reliably without rotation.

Still other objects and advantages of the invention will in part be obvious and will in part be apparent from the specification.

The above and other objects, which will be apparent to those skilled in the art, are achieved in the present invention which is directed to a stunner for stunning an animal comprising a housing having a front end, an inner chamber in the housing having a forward end and a rearward end, a piston slideable within the inner chamber, and a stunning rod within the housing and capable of being driven by the piston forward and rearward towards and away from the front end of the housing. A first pressure chamber is disposed adjacent the inner chamber. The first pressure chamber is in communication with the rearward end of the inner chamber, and the first pressure chamber supplies a pressurized fluid rearward of the piston. A second pressure chamber is disposed adjacent the inner chamber. The second pressure chamber is in communication with the forward end of the inner chamber, and the second pressure chamber supplies a pressurized fluid forward of the piston. The stunner may further include a valve system to alternately control flow of the pressurized fluid from the first pressure chamber to the rearward end of the inner chamber to move the piston and drive the stunning rod forward to stun an animal, and from the second pressure chamber to the forward end of the inner chamber to move the piston and drive the stunning rod rearward and retract the stunning rod.

The second pressure chamber may be outward of and surround the inner chamber, and may be of annular cylindrical configuration. The second pressure chamber may be smaller than the first pressure chamber.

The first pressure chamber may be outward of and surround the inner chamber adjacent a central portion or rearward end of the inner chamber, and the second pressure chamber may be outward of and surround the inner chamber adjacent a central portion or forward end of the inner chamber.

The valve system may comprise a valve body with a plurality of passageways. The valve body additionally controls flow of the pressurized fluid to the first and second pressure chambers to fill the first and second pressure chambers with pressurized fluid prior to supplying the pressurized fluid rearward of the piston to move the piston and drive the stunning rod forward.

In a related aspect, the present invention is directed to a method of stunning an animal comprising providing an animal stunner having a housing with a front end, an inner chamber in the housing having a forward end and a rearward end, a piston slideable within the inner chamber, and a stunning rod within the housing capable of being driven by the piston forward and rearward towards and away from the front end of the housing. The stunner includes a first pressure chamber adjacent the inner chamber, with the first pressure chamber being in communication with the rearward end of the inner chamber, and a second pressure chamber adjacent the inner chamber, with the second pressure chamber being in communication with the forward end of the inner chamber. The stunner also includes a valve system to alternately control flow of the pressurized fluid from the first pressure chamber to the rearward end of the inner chamber, and from the second pressure chamber to the forward end of the inner chamber. The method includes supplying a pressurized fluid to the first pressure chamber, and supplying a pressurized fluid to the second pressure chamber. The method further includes supplying the pressurized fluid from the first pressure chamber to the rearward end of the inner chamber to move the piston and drive the stunning rod forward, to stun an animal, and subsequently supplying the pressurized fluid from the second pressure chamber to the forward end of the inner chamber to move the piston and drive the stunning rod rearward, and retract the stunning rod. The pressurized fluid may be supplied to the first pressure chamber and to the second pressure chamber simultaneously.

The method may include providing a valve system to alternately control flow of the pressurized fluid from the first pressure chamber to the rearward end of the inner chamber, and from the second pressure chamber to the forward end of the inner chamber. The method may further include operating the valve system to control flow of the pressurized fluid from the first pressure chamber to the rearward end of the inner chamber and subsequently from the second pressure chamber to the forward end of the inner chamber.

The valve system may additionally control flow of the pressurized fluid to the first and second pressure chambers to fill the first and second pressure chambers with pressurized fluid simultaneously, prior to supplying the pressurized fluid rearward of the piston to move the piston and drive the stunning rod forward. The second pressure chamber may contain less pressurized fluid than the first pressure chamber.

The present invention is directed in another aspect to a stunner for stunning an animal comprising a housing having a stunning rod therein capable of being driven along a longitudinal axis forward to stun an animal and rearward to retract the stunning rod, a handle having a valve trigger to control flow of pressurized fluid to drive forward and retract the stunning rod, and a mount between the handle and the housing. The mount has a first portion connected to the housing, a second portion connected to the handle, and at least one cushion disposed between the first and second portions. The mount acts to absorb vibration and shock transmitted from the housing to the handle.

The handle may include a valve controlled by the valve trigger. The mount first portion may contain at least one passageway for flowing pressurized air connected to the housing and the mount second portion may contain at least one passageway for flowing pressurized air connected to the handle valve. The at least one passageways of the mount first and second portions may be connected to permit pressurized air to flow between the housing and the handle valve. There may be included a plurality of passageways within each of the mount first and second portions, and a plurality of hoses connecting the passageways of the mount first and second portions. At least one fastener may extend through the at least one cushion securing the mount first portion to the mount second portion.

One of the mount first and second portions may have a central flange and the other of the mount first and second portions may have a pair of side flanges, and there may be included a cushion disposed between the central flange and the each of the side flanges and at least one fastener extending through the cushions and into the flanges to secure the mount first portion to the mount second portion. The mount may be securable to the housing to orient the handle in a fixed position wherein movement of the trigger is in a direction normal to the longitudinal axis. There may be further included an auxiliary handle on the housing having a cushion to absorb vibration and shock transmitted from the housing to the auxiliary handle.

The present invention is further directed to a stunner for stunning an animal comprising a housing having a stunning rod therein capable of being driven along a longitudinal axis forward to stun an animal and rearward to retract the stunning rod, a handle having a valve and a moveable valve trigger to control flow of pressurized fluid to drive forward and retract the stunning rod, and a mount between the handle and the housing. The mount may have at least one passageway for flowing pressurized air between the housing and the handle valve. The mount is securable to the housing to orient the handle in a fixed position wherein movement of the trigger is in a direction other than the longitudinal axis. For example, the mount may orient the direction of handle trigger movement normal to the longitudinal axis.

In yet another aspect the present invention is directed to a stunner for stunning an animal comprising a housing having a stunning rod therein capable of being driven along a longitudinal axis forward to stun an animal and rearward to retract the stunning rod, a handle having a valve trigger to control flow of pressurized fluid to drive the stunning rod, and a mount between the handle and the housing. The mount has a first portion connected to the housing, and a second portion connected to the handle. The first and second mount portions each have opposite edges, the edges of the first mount portion being spaced from the edges of the second mount portion. The first and second mount portions are secured to each other between the opposite edges. At least one cushion may be disposed between the first and second mount portions, and has opposite sides to seal the space between the first and second mount portions.

The at least one cushion may have a first portion with an edge to seal the space between one of the opposite edge portions of the first and second mount portion. The cushion may also have a second portion with an edge sealing the space between the other of the opposite edge portions of the first and second mount portions. The mounts may be secured along an axis to permit a pivoting motion between the first and second mount portions.

Each of the housing and handle has at least one passageway for the pressurized fluid to drive the stunning rod. Each of the first and second mount portions may contain at least one passageway connecting the housing and handle passageways proximate to the location at which the first and second mount portions are secured to each other. The first and second cushion portions may be separate pieces. Alternatively, the cushion may be a single piece which further includes a third portion for connecting the first and second cushion portions together.

The first and second cushion portions may have first and second sides, and the thickness of the first sides of the first and second cushions may be the same or different from the thickness of the second sides of the first and second cushions. The cushion may be a single piece, and further may include a third portion for connecting the first and second cushion portions. The third portion may further include at least one passageway for connecting the housing and handle passageways. The mounts may be secured along an axis to permit a pivoting motion between the first and second mount portions, and further include a pin along the axis. The pin may include at least one passageway for connecting the housing and handle passageways.

In still another aspect the present invention is directed to a mount for connecting a housing to a handle of an animal stunner, the housing having a stunning rod therein capable of being driven along a longitudinal axis forward to stun an animal and rearward to retract the stunning rod, the handle having a valve trigger to control flow of a pressurized fluid to drive the stunning rod forward, each of the housing and handle having at least one passageway for the pressurized fluid to drive the stunning rod. The mount comprises a first mount portion for connection to the housing, and a second mount portion for connection to the handle. The first and second mount portions each have opposite edges. The edges of the first mount portion are spaced from the edges of the second mount portion, the first and second mount portions being secured to each other between the opposite edges. Each of the first and second mount portions contain at least one passageway for connecting the housing and handle passageways proximate to the location at which the first and second mount portions are secured to each other.

The first mount portion and second mount portion may be secured to each other along an axis to permit a pivoting motion between the first and second mount portions. The spacing between the first edges of the first mount portion and second mount portion may not be equal to the spacing between the second edges of the first mount portion and second mount portion. The mount may further include a pin along the axis wherein the pin includes at least one passageway for connecting the housing and handle passageways. The at least one pin may be disposed along the axis where the first and second mount portions are secured. At least one cushion may further be disposed between the mount first and second portions.

The at least one cushion may have a first portion with an edge sealing the space between one of the opposite edge portions of the first and second mount portion, and the cushion may have a second portion with an edge sealing the space between the other of the opposite edge portions of the first and second mount portions. The first and second cushion portions may be separate pieces. The cushion may also be a single piece, further including a third portion for connecting the first and second cushion portions together. The third portion of the cushion may further include at least one passageway for connecting the housing and handle passageways.

In another aspect the present invention is directed to an anti-shock cushion for absorbing vibration and shock transmitted from a housing to a handle of a stunner for stunning an animal. The handle has a valve and a valve trigger to control flow of the pressurized fluid to the stunner and a mount between the handle and the housing. The mount has a first portion connected to the housing, a second portion connected to the handle, and the first and second mount portions each have opposite edges. The edges of the first mount portion are spaced from the edges of the second mount portion, with the first and second mount portions being secured to each other between the opposite edges. The cushion is disposed between the first and second mount portions and has a boss extending therefrom received in an opening in one of the mount portions. The cushion has lips extending upward and downward on three sides thereof to seal the space between the first and second mount portions.

Yet another aspect of the present invention is directed to a stunner for stunning an animal comprising a housing having a stunning rod therein capable of being driven along a longitudinal axis forward to stun an animal and rearward to retract the stunning rod, a first handle having a valve and a first moveable valve trigger to control flow of pressurized fluid to drive the stunning rod, and a second handle. The second handle has a valve and a second moveable valve trigger to control flow of the pressurized fluid. The valves of the first and second handles are connected by passageways such that both of the first and second valve triggers must be depressed to provide pressurized fluid to drive the stunning rod forward. A bracket extends from the housing on which is mounted the second handle and the second moveable valve trigger extending outward from a side of the second handle. The second handle is rotatable within the bracket and may be fixed in place in one of a plurality of positions. The second moveable valve trigger may be positioned to extend from the second handle and be operable at a plurality of different fixed positions relative to the housing.

The housing has a front end from which the stunning rod projects forward to stun the animal, a rear end opposite the front end, and sides between the front and rear ends. The first handle is a main handle extending from a side of the housing and the second handle is an auxiliary handle extending from the rear end of the housing. The handle is oriented substantially perpendicular to the longitudinal axis. One of the bracket and the second handle may have a projection and the other of the bracket and the second handle may have an opening for receiving the projection. The projection is removable from the opening to permit the second handle to rotate relative to the bracket to the plurality of positions. The projection is replaceable within the opening to fix the second handle in place in one of the plurality of positions. The projection may comprise a spline at an end of the second handle, and the opening may comprise grooves in the bracket for receiving the spline. The second handle is slideable with respect to the bracket to disengage the spline from the bracket grooves to permit the second handle to rotate, the splines being re-engageable within the grooves to fix the second handle in place. The valve of the second handle may be disposed on the bracket at an end of the second handle opposite the spline, the second handle valve being removable from the bracket to permit the spline to be disengaged from the bracket grooves and replaceable on the bracket when the splines are re-engageable within the grooves to fix the second handle in place.

In another aspect the present invention is directed to a stunner for stunning an animal comprising a housing having a stunning rod therein capable of being driven along a longitudinal axis forward to stun an animal and rearward to retract the stunning rod, a first handle having a valve and a first moveable trigger to control flow of pressurized fluid to drive the stunning rod forward, and a second handle having a valve and a second moveable valve trigger to control flow of the pressurized fluid. The valves of the first and second handles being connected by passageways such that the both of the first and second valve triggers must be depressed to provide pressurized fluid to drive the stunning rod forward. The second handle is disposed on a second handle bracket. A mounting bracket extends from the housing on which is mounted the second handle bracket. A first anti-shock cushion is disposed between the second mounting bracket and the second handle bracket.

The first anti-shock cushion may include a plurality of bosses extending therefrom, and the second handle bracket includes openings for receiving the bosses. An end cap may be secured to the mounting bracket on the side opposite the second handle bracket, and a second anti-shock cushion may be disposed between the mounting bracket and the end cap.

In a further aspect the present invention is directed to an anti-shock cushion for absorbing vibration and shock transmitted from a housing to a handle of a stunner for stunning an animal. The handle has a valve and a valve trigger to control flow of the pressurized fluid to the stunner, the handle being disposed on a handle bracket mounted on a mounting bracket extending from the housing. The cushion is elongated and disposed between the mounting bracket and the handle bracket. The cushion includes a plurality of spaced bosses extending therefrom along the length of the cushion and received in openings in the handle bracket. The bosses extending from the anti-shock cushion may have concave sides facing each other, and the cushions may have openings between the bosses for receiving bolts to connect the mounting bracket and the handle bracket.

A further aspect of the present invention is directed to a method of operating a stunner for stunning an animal. The method provides a stunner having a housing with a stunning rod therein capable of being driven along a longitudinal axis forward to stun an animal and rearward to retract the stunning rod. A first handle has a valve and a first moveable valve trigger to control flow of the pressurized fluid to drive forward and retract the stunning rod. A second handle has a valve and a second moveable valve trigger to control flow of the pressurized fluid. The valves of the first and second handles are connected by passageways such that the both of the first and second valve triggers must be depressed to provide pressurized fluid to drive the stunning rod forward. A bracket extends from the housing on which is mounted the second handle and the second moveable valve trigger extending outward from a side of the second handle. The handle is rotatable within the bracket and fixed in place in a first position. The second trigger extends from the second handle and is operable at a first fixed position relative to the housing. The method includes rotating the second handle within the bracket to a second position different from the first position, and fixing the second handle in place in the second position. The second trigger extends from the second handle and is operable at the second fixed position different from the first fixed position relative to the housing.

One of the bracket and the second handle may have a projection and the other of the bracket and the second handle has an opening for receiving the projection. The method includes, prior to rotating the second handle, removing the projection from the opening to permit the second handle to rotate relative to the bracket. The method further includes, after rotating the second handle to the second position, replacing the projection within the opening to fix the second handle in place in the second position. The projection may comprise a spline at an end of the second handle, and the opening may comprise grooves in the bracket for receiving the spline. The method may include, prior to rotating the second handle, siding the second handle with respect to the bracket to disengage the spline from the bracket grooves to permit the second handle to rotate. The method may further include, after rotating the second handle relative to the bracket to the second position, sliding the handle with respect to the bracket to re-engage the spline within the bracket grooves to fix the second handle in place in the second position.

The valve of the second handle may be disposed on the bracket at an end of the second handle opposite the spline. The method may include removing the second handle valve from the bracket to permit the spline to be disengaged from the bracket grooves, and, after re-engaging the splines within the bracket grooves to fix the second handle in place, replacing the valve on the bracket.

In a further aspect the present invention is directed to a stunner for stunning an animal comprising a housing having a front end, and a stunning rod within the housing and capable of being driven forward along a longitudinal axis towards the front end of the housing. A catch is mounted within the housing for alternately holding and releasing the stunning rod. The catch has a body portion pivotally mounted on a catch pivot disposed on a side away from the stunning rod longitudinal axis and an end portion extending from the body portion toward the housing front end and distal from the catch pivot. The catch end portion is movable between a hold position toward the longitudinal axis preventing the stunning rod from being driven forward and a release position away from the stunning rod longitudinal axis permitting the stunning rod to be driven forward. A catch piston is disposed adjacent the catch end portion on a side away from the longitudinal axis. The catch piston is in sliding contact with the catch adjacent the catch end portion and out of contact with the catch body portion. The catch piston is adapted to slide in the directions of the longitudinal axis between a first position urging the catch end portion toward the stunning rod longitudinal axis in the hold position, thereby holding and preventing the stunning rod from being driven forward, and a second position permitting the catch end portion to move to the release position away from the stunning rod longitudinal axis releasing and permitting the stunning rod to be driven forward. A valve is operable to control a flow of air to cause the catch piston to move from the first position to the second position, thereby driving the stunning rod forward along the longitudinal axis to stun an animal.

The catch pivot may have a lip extending inwardly from an end of a catch pivot body. The catch body may include a flange extending outwardly away from the longitudinal axis, with the catch body flange engaging the inwardly extending catch pivot lip to permit the catch to pivot between the hold and release positions. The catch pivot may comprise a ring extending around the longitudinal axis. A plurality of catches may be arranged about the longitudinal axis, with each catch curved in an arc about the longitudinal axis, the catches pivoting on the catch pivot ring.

The present invention is also directed to a method of stunning an animal comprising providing an animal stunner having a housing with a front end and a stunning rod within the housing and capable of being driven forward along a longitudinal axis towards the front end of the housing. The stunner includes a catch mounted within the housing for alternately holding and releasing the stunning rod. The catch has a body portion pivotally mounted on a catch pivot disposed on a side away from the stunning rod longitudinal axis and an end portion extending from the body portion toward the housing front end and distal from the catch pivot. The catch end portion is movable between a hold position toward the longitudinal axis engaging the stunning rod and a release position away from longitudinal axis disengaging the stunning rod. The stunner also includes a catch piston disposed adjacent the catch end portion on a side away from the longitudinal axis. The catch piston is adapted to slide in the directions of the longitudinal axis between positions toward and away from the housing front end, and is in sliding contact with the catch adjacent the catch end portion and out of contact with the catch body portion. The stunner further includes a valve operable to control a flow of air to cause the catch piston to move from the first position to the second position. The method includes positioning the catch piston in a first position along the longitudinal axis away from the housing front end, with the catch piston being out of contact with the catch body portion while urging the catch end portion toward the stunning rod longitudinal axis in the hold position, thereby holding and preventing the stunning rod from being driven forward. The method also includes operating the valve to cause a flow of air to move the catch piston along the longitudinal axis from the first position to a second position toward the housing front end. The catch piston in the second position is out of contact with the catch body portion while permitting the catch end portion to move to the release position away from the longitudinal axis releasing the stunning rod, thereby permitting the stunning rod to be driven forward along the longitudinal axis to stun an animal.

The method may further include, after stunning the animal, permitting the stunning rod to return to the first position wherein the catch piston is positioned along the longitudinal axis away from the housing front end. The catch piston may remain out of contact with the catch body portion while urging the catch end portion toward the stunning rod longitudinal axis in the hold position, thereby holding and preventing the stunning rod from being driven forward until the valve is operated.

The catch pivot may comprise a lip extending inwardly from an end of a catch pivot body and the catch body may include a flange extending outwardly away from the longitudinal axis, with the catch body flange engaging the inwardly extending catch pivot lip to permit the catch to pivot between the hold and release positions while the catch piston remains out of contact with the catch body portion.

The catch pivot may comprise a ring extending around the longitudinal axis, and there may be a plurality of catches arranged about the longitudinal axis, with each catch having a body portion curved in an arc about the longitudinal axis. The catches pivot on the catch pivot ring between the hold and release positions while the catch piston remains out of contact with the curved catch body portion.

In another aspect, the present invention is directed to a stunner for stunning an animal comprising a housing having a front end and a stunning rod within the housing and capable of being driven forward along a longitudinal axis towards the front end of the housing. A catch is mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end. The catch has an end portion extending from the body portion toward the housing front end and distal from the catch pivot. The catch end portion is movable between a hold position toward the longitudinal axis, wherein the catch body is in contact with both the stationary catch pivot and the stationary catch support distal end, preventing the stunning rod from being driven forward, and a release position away from the stunning rod longitudinal axis, wherein the catch body is in contact with the stationary catch pivot and out of contact with the stationary catch support distal end, permitting the stunning rod to be driven forward. A catch piston is disposed adjacent the catch end portion on a side away from the longitudinal axis. The catch piston is in sliding contact with the catch adjacent the catch end portion. The catch piston is adapted to slide in the directions of the longitudinal axis between a first position urging the catch end portion toward the stunning rod longitudinal axis in the hold position, thereby holding and preventing the stunning rod from being driven forward, and a second position permitting the catch end portion to move to the release position away from the stunning rod longitudinal axis releasing and permitting the stunning rod to be driven forward. A valve is operable to control a flow of air to cause the catch piston to move from the first position to the second position, thereby driving the stunning rod forward along the longitudinal axis to stun an animal.

In a related aspect the present invention is directed to a method of stunning an animal comprising providing an animal stunner having a housing with a front end and a stunning rod within the housing and capable of being driven forward along a longitudinal axis towards the front end of the housing. The stunner includes a catch mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end. The catch has an end portion extending from the body portion toward the housing front end and distal from the catch pivot. The catch end portion is movable between a hold position toward the longitudinal axis, and a release position away from the stunning rod longitudinal axis. The stunner also includes a catch piston disposed adjacent the catch end portion on a side away from the longitudinal axis. The catch piston is in sliding contact with the catch adjacent the catch end portion. The catch piston is adapted to slide in the directions of the longitudinal axis between positions toward and away from the housing front end; and a valve operable to control a flow of air to cause the catch piston to move from the first position to the second position. The method includes positioning the catch piston in a first position along the longitudinal axis away from the housing front end urging the catch end portion toward the stunning rod longitudinal axis in the hold position. The catch body is in contact with both the stationary catch pivot and the stationary catch support distal end, thereby holding and preventing the stunning rod from being driven forward. The catch piston is in sliding contact with the catch adjacent the catch end portion. The method further includes operating the valve to cause a flow of air to move the catch piston along the longitudinal axis from the first position to a second position toward the housing front end wherein the catch body is in contact with the stationary catch pivot and out of contact with the stationary catch support distal end. The second position permits the catch end portion to move to the release position away from the longitudinal axis releasing and permitting the stunning rod to be driven forward along the longitudinal axis to stun an animal.

The method may further include, after stunning the animal, permitting the stunning rod to return to the first position wherein the catch piston is positioned along the longitudinal axis away from the housing front end. The catch piston urges the catch end portion toward the stunning rod longitudinal axis in the hold position and the catch body into contact with the stationary catch support distal end, thereby holding and preventing the stunning rod from being driven forward until the valve is operated.

The catch pivot may comprise a lip extending inwardly from an end of a catch pivot body and the catch body may include a flange extending outwardly away from the longitudinal axis. The catch body flange engages the inwardly extending catch pivot lip to permit the catch to pivot between the hold and release positions while the catch body moves into and out of contact with the stationary catch support distal end, respectively.

The catch pivot may comprise a ring and extend around the longitudinal axis, and the stationary catch support distal end may be circular and extend around the longitudinal axis. There may be a plurality of catches arranged about the longitudinal axis, with each catch having a body portion curved in an arc about the longitudinal axis. The catches pivot on the catch pivot ring between the hold and release positions while the catch body moves into and out of contact with the stationary catch support distal end, respectively.

In a further aspect the present invention provides a stunner for stunning an animal comprising a housing having a front end and a stunning rod within the housing and capable of being driven forward along a longitudinal axis towards the front end of the housing. A catch is mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end and an elastic member adjacent the catch support distal end. The catch has an end portion extending from the body portion toward the housing front end and distal from the catch pivot. The catch end portion is movable between a hold position toward the longitudinal axis, preventing the stunning rod from being driven forward, and a release position away from the stunning rod longitudinal axis, assisted by the elastic member, permitting the stunning rod to be driven forward. A catch piston is disposed adjacent the catch end portion on a side away from the longitudinal axis. The catch piston is in sliding contact with the catch adjacent the catch end portion. The catch piston is adapted to slide in the directions of the longitudinal axis between a first position urging the catch end portion toward the stunning rod longitudinal axis in the hold position, thereby holding and preventing the stunning rod from being driven forward, and a second position permitting the catch end portion to move to the release position away from the stunning rod longitudinal axis, assisted by the elastic member, releasing and permitting the stunning rod to be driven forward. A valve is operable to control a flow of air to cause the catch piston to move from the first position to the second position, thereby driving the stunning rod forward along the longitudinal axis to stun an animal.

Another aspect of the invention provides a catch engageable with a catch pivot ring for capturing and releasing a stunning rod moveable along a longitudinal axis in a stunner for stunning an animal. The catch comprises a plurality of arcuate sections substantially forming a cylinder, each arcuate section having a forward end and a rearward end. The catch includes an inner wall toward the longitudinal axis and an outer wall away from the longitudinal axis. The catch includes a flange at the rearward end of the arcuate section extending outwardly directly from the outer wall and away from the longitudinal axis and a lip at the forward end of the arcuate section extending inwardly from the inner wall and toward the longitudinal axis. Each of the arcuate section flanges is engageable with an inner lip of the catch pivot ring allowing the arcuate sections to pivot about the catch pivot ring inner lip. The arcuate sections are pivotable from a closed position wherein the arcuate section lips are proximate one another to an open position wherein the arcuate section lips are extended outwardly from the longitudinal axis when the arcuate sections pivot about the catch pivot ring inner lip from the closed position. The catch may be engageable with a catch piston in the animal stunner, wherein the each arcuate section forward end is movable by the catch piston to a hold position toward the longitudinal axis where the arcuate section lip engages the stunning rod, preventing the stunning rod from being driven in a forward direction. The outer wall of each of the arcuate sections may have a substantially straight portion adjacent the outwardly extending flange at the rearward end, the substantially straight portion of the outer wall contacting the catch pivot ring inner lip. The arcuate sections may include an internal bevel along the inner wall of the rearward end of the arcuate section.

Another aspect of the invention provides a catch engageable with a catch pivot ring for capturing and releasing a stunning rod moveable along a longitudinal axis in a stunner for stunning an animal. The catch comprises a plurality of quarter cylinders substantially forming a cylinder, each of the quarter cylinders having a forward end and a rearward end. The catch includes a flange at the rearward end of the quarter cylinder extending outwardly from the rearward end of the quarter cylinder, the quarter cylinder having a substantially straight portion adjacent the flange. The catch includes a lip extending inwardly from the forward end of the quarter cylinder. The flange is engageable with an inner lip of the catch pivot ring allowing the catch to pivot about the inner lip of the substantially straight portion of the quarter cylinder contacting the catch pivot ring inner lip. The quarter cylinders are pivotable from a closed position wherein the flanges are proximate to one another to an open position wherein the flanges are extended outwardly from the longitudinal axis when the quarter cylinders pivot about the catch pivot ring inner lip from the closed position. Each of the arcuate sections may include an internal bevel along the inner wall of the rearward end of the arcuate section.

In a further related aspect the present invention provides a method of stunning an animal comprising providing an animal stunner having a housing with a front end and a stunning rod within the housing and capable of being driven forward along a longitudinal axis towards the front end of the housing. The stunner includes a catch mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end and an elastic member adjacent the catch support distal end. The catch has an end portion extending from the body portion toward the housing front end and distal from the catch pivot. The catch end portion is movable between a hold position toward the longitudinal axis, and a release position away from the stunning rod longitudinal axis. The stunner also includes a catch piston disposed adjacent the catch end portion on a side away from the longitudinal axis. The catch piston is in sliding contact with the catch adjacent the catch end portion. The catch piston is adapted to slide in the directions of the longitudinal axis between positions toward and away from the housing front end. The stunner further includes a valve operable to control a flow of air to cause the catch piston to move from the first position to the second position. The method includes positioning the catch piston in a first position along the longitudinal axis away from the housing front end urging the catch end portion toward the stunning rod longitudinal axis in the hold position, thereby holding and preventing the stunning rod from being driven forward. The catch piston is in sliding contact with the catch adjacent the catch end portion. The method also includes operating the valve to cause a flow of air to move the catch piston along the longitudinal axis from the first position to a second position toward the housing front end. The second position permits the catch end portion to move to the release position away from the longitudinal axis, assisted by the elastic member, releasing and permitting the stunning rod to be driven forward along the longitudinal axis to stun an animal.

The method may further include, after stunning the animal, permitting the stunning rod to return to the first position wherein the catch piston is positioned along the longitudinal axis away from the housing front end. The catch piston urging the catch end portion toward the stunning rod longitudinal axis in the hold position and the catch body into contact with the stationary catch support distal end, thereby holding and preventing the stunning rod from being driven forward until the valve is operated.

The catch pivot may comprise a lip extending inwardly from an end of a catch pivot body and the catch body may include a flange extending outwardly away from the longitudinal axis. The catch body flange may engage the inwardly extending catch pivot lip to permit the catch to pivot between the hold and release positions while the catch body moves into and out of contact with the stationary catch support distal end, respectively.

The catch pivot may comprise a ring and extend around the longitudinal axis, and the stationary catch support distal end may be circular and extend around the longitudinal axis. There may be a plurality of catches arranged about the longitudinal axis, with each catch having a body portion curved in an arc about the longitudinal axis. The catches pivoting on the catch pivot ring between the hold and release positions while the catch body moves into and out of contact with the stationary catch support distal end, respectively.

In a further aspect, the present invention is directed to a stunning rod adapted for use in an animal stunner. The rod is mountable to a piston moveable within an inner chamber of the stunner, and the inner chamber contains a catch for alternately holding and releasing the stunning rod. The stunning rod comprises an elongated body having a longitudinal axis. The stunning rod elongated body has a forward end and an opposite rearward end, with the forward end being sized for striking (e.g. penetrating) an animal's head and adaptable for attaching a hardened tip. The opposite rearward end of stunning rod has an outwardly extending lip meant for engagement with the catch. A mounting portion between the forward and rearward ends has outwardly extending flanges to permit a piston to be slideably received against the flanges. The stunning rod between the mounting portion and forward end has a first pair of opposite sides having a first radius and first width, and a second pair of opposite sides having a second radius and a second width. The radius of the second pair of the opposite sides is different from the radius of the first pair of opposite sides, and the first width between the first pair of opposite sides is smaller than the second width between the second pair of opposite sides. The stunning rod is capable of being driven forward along the longitudinal axis within the stunner inner chamber to stun an animal. It is also capable of being driven rearward along the longitudinal axis to retract and hold the stunning rod by the catch.

The radius of the first pair of opposite sides of the stunning rod may be from about 0.50-0.70 inches (1.27-1.78 cm), and the radius of the second pair of opposite sides may be from about 0.25-0.45 inches (0.64-1.14 cm). The width between the first pair of opposite sides may be from about 0.425-0.625 inches (1.0795-1.5875 cm), and the width between the second pair of opposite sides may be from about 0.65-0.85 inches (1.65-2.16 cm).

The stunning rod may further include a piston on the mounting portion adjacent the outwardly extending flange. The piston may be slideably mounted on the mounting portion, or may be one piece with elongated body of the stunning rod. The stunning rod may further include an outwardly extending lip on the rearward end for engagement with the catch. The outwardly extending lip may be slideably mounted on the rearward end, or may be of one piece with elongated body of the stunning rod.

In a further related aspect, the present invention provides a method of using a stunning rod in an animal stunner. The stunner has an inner chamber and a catch for alternately holding and releasing the stunning rod. The stunning rod has an elongated body having a longitudinal axis, the elongated body has a forward end being sized for striking an animal's head, and an opposite rearward end has an outwardly extending lip meant for engaging the catch. A mounting portion between the forward and rearward ends has outwardly extending flanges to permit a piston to be slideably received against the flanges. The stunning rod between the mounting portion and forward end has a first pair of opposite sides having a first radius and first width, and a second pair of opposite sides having a second radius and a second width. The radius of the second pair of opposite sides is different from the radius of the first pair of opposite sides, and the first width between the first pair of opposite sides is smaller than the second width between the second pair of opposite sides.

The method may include providing on the stunning rod a piston moveable within the inner chamber of the stunner. The method may further include providing on the stunner a housing nose which has a bore. The bore in the outer housing nose is slightly larger than and conforming to the first radius and first diameter and the second radius and second diameter of the stunning rod. The method may then include mounting the stunning rod and piston in the stunner inner chamber, with the stunning rod extending through the bore of the stunner housing nose. The method may further include supplying a pressurized fluid to the rearward end of the inner chamber to move the piston, and sliding the rod along the longitudinal axis within the inner chamber through the bore of the outer housing nose to drive the stunning rod forward to stun an animal. The method may still further include retracting the stunning rod rearward along the longitudinal axis, and holding the stunning rod within the inner chamber by engagement of the catch with the outwardly extending lip at the rearward end of the rod. The rod may have the radii of the first and second pair of opposite sides as described above, and slide within the inner chamber without rotational movement about the longitudinal axis.

In a further aspect, the present invention is directed to a stunner for stunning an animal. The stunner has a housing having a front end, with an inner chamber in the housing having a forward end and a rearward end. A piston is slideable within the inner chamber. A stunning rod within the housing has an elongated body. The stunning rod is capable of being driven by the piston forward and rearward towards and away from the front end of the housing. The elongated body has a forward end and an opposite rearward end. The forward end is sized for striking an animal's head, and the opposite rearward end has an outwardly extending lip meant for engagement with the catch. The elongated body along at least a portion of its length has a first pair of opposite sides having a first radius and a first width, and a second pair of opposite sides having a second radius and a second width. The radius of the second pair of opposite sides is different from the radius of the first pair of opposite sides. The first width between the first pair of opposite sides is smaller than the second width between the second pair of opposite sides. The rod may have the radii of the first and second pair of opposite sides as described above. The stunner has a catch for alternately holding and releasing the stunning rod.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 14 is a side elevational view of a catch according to the present invention.

FIG. 15 is a cross sectional view of the catch shown in FIG. 14.

FIG. 16 is a perspective view of the catch shown in FIG. 14.

FIG. 17 is an end elevational view of four of the catches shown in FIG. 14 arrayed in the hold position around the longitudinal axis of the stunning rod.

FIG. 18 is a top elevational view of the catch pivot ring according to the present invention.

FIG. 19 is a side cross sectional view of the catch pivot ring shown in FIG. 18.

FIG. 20 is a perspective view of the catch pivot ring shown in FIG. 18.

FIG. 32 is a cross-sectional view through the body of the stunning rod, according to an alternate embodiment of the present invention, showing the different radii of and widths between the opposing sides.

FIG. 33 is a frontal view of the stunning rod of FIG. 32.

FIG. 34 is a frontal view of the stunning rod of FIG. 32 with a piston, according to an alternate embodiment of the present invention.

FIG. 35 is a rear perspective view of the stunning rod and piston of FIG. 34.

FIG. 36 is a front perspective view of the stunning rod and piston of FIG. 35.

FIG. 37 is an exploded side view of the stunning rod of FIG. 35 with a hardened tip and rearward end catch lip both attached to the rod by a screw.

FIG. 38 is an exploded side view of an alternate embodiment of the stunning rod of FIG. 37 with the rearward end catch lip attached via a threaded end post.

FIG. 39 is a longitudinal cross-sectional view of the stunning rod and piston of FIG. 35.

FIG. 40 is a side view of the assembled stunning rod of FIG. 37.

FIG. 41 is a rear view of the stunning rod and piston of FIG. 35.

FIG. 58 is a top perspective view of the anti-shock members of the handle mount embodiment of FIG. 49.

FIG. 59 is a bottom perspective view of the anti-shock members of FIG. 58.

FIG. 60 is a top perspective view of an embodiment of the anti-shock members of FIG. 58, where the top and bottom planar surfaces of the anti-shock members are angled to permit the handle mount to be installed on the stunner at an angle other than 90°.

FIG. 61 is a bottom perspective view of the anti-shock members of FIG. 60.

FIG. 62 is a side view of the handle mount embodiment of FIG. 49 installed on the stunner with the anti-shock members of FIG. 60.

FIG. 63 is a side cutaway view of the handle mount and stunner assembly of FIG. 62 along lines 63-63 of FIG. 64.

FIG. 64 is a bottom perspective view of the handle mount and stunner assembly of FIG. 62.

FIG. 65 is a top perspective view of the handle mount and stunner assembly of FIG. 62.

FIG. 66 is an exploded top perspective view of yet another embodiment of the handle mount of FIG. 28 employed between the main handle and main valve body of the stunner of the present invention.

FIG. 67 is an exploded rear view of the handle mount embodiment of FIG. 66.

FIG. 68 is an exploded bottom perspective view of the handle mount embodiment of FIG. 66.

FIG. 79 is a side view of the auxiliary handle embodiment of FIG. 77 with the trigger positioned in a downwards direction.

FIG. 80 is a side view of the auxiliary handle embodiment of FIG. 77 with the trigger positioned in an upwards direction.

FIG. 81 is a side view of the auxiliary handle embodiment of FIG. 77 with the valve removed and the handle pulled out so that the spline is visible, thus permitting rotation of the handle.

FIG. 82 is a top perspective view of an end cap used in an embodiment of the auxiliary handle for the stunner.

FIG. 83 is a bottom perspective view of the end cap of FIG. 82.

FIG. 84 is a top perspective view of cushion used in an embodiment of the auxiliary handle for the stunner.

FIG. 85 is a bottom perspective view of the cushion of FIG. 84.

FIG. 86 is a perspective view of an embodiment of the auxiliary handle for the stunner using the end cap of FIG. 82 and the cushion of FIG. 84.

DESCRIPTION OF EXEMPLARY EMBODIMENT(S)

Figure 1:
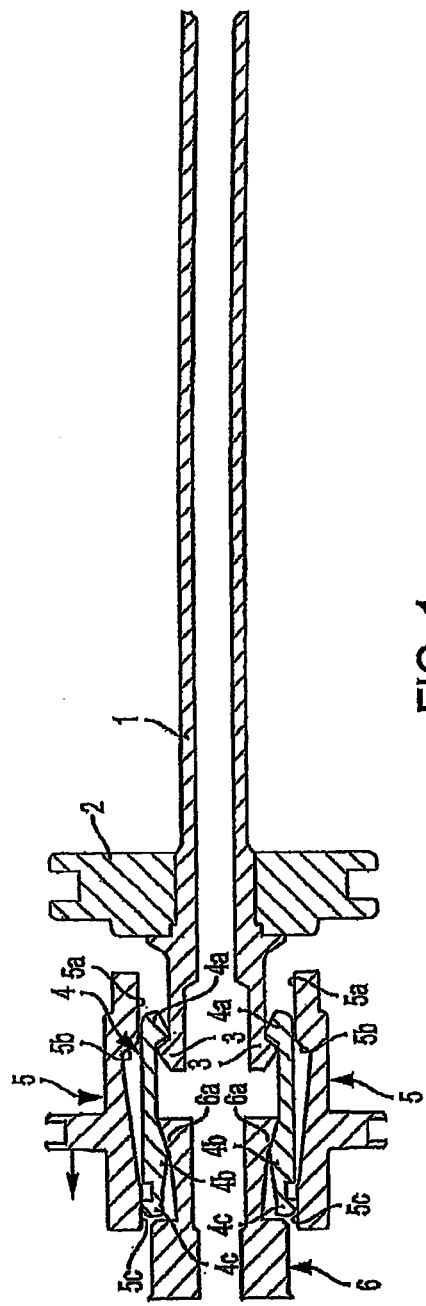
FIGS. 1 and 2 are cross sectional views of a prior art stunner catch system in hold and release positions, respectively.
Figure 2:
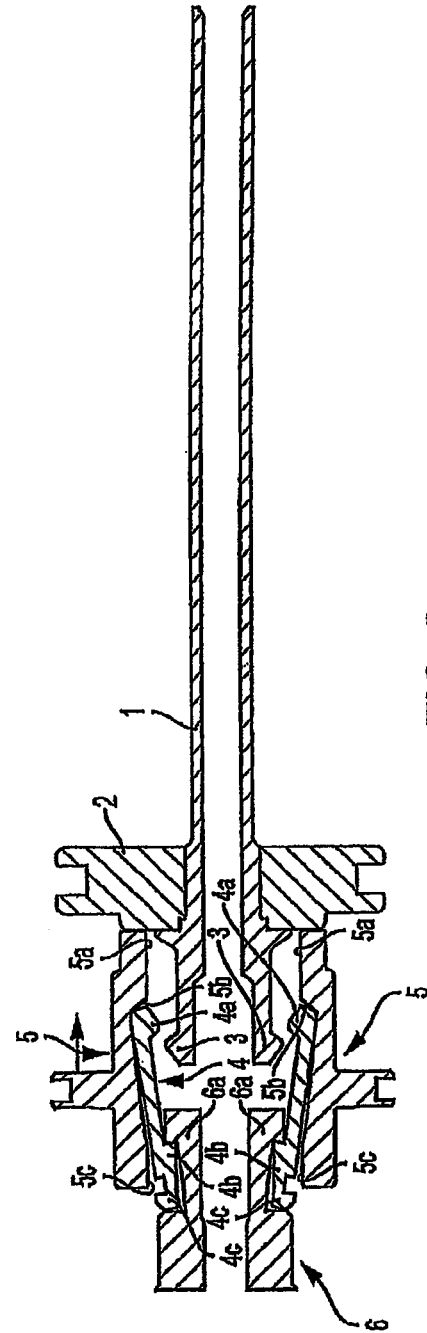

In describing the embodiments of the present invention, reference will be made herein to FIGS. 3-87 of the drawings in which like numerals refer to like features of the invention.

Structure and operation of the exemplary animal stunner 10 is shown in general in FIGS. 3-8. The stunner 10 includes an outer elongated hollow housing 12, an outer housing nose or front end 14, a tail end 16, a stunning rod 40 and a catch 20 for holding and releasing the stunning rod 40. The portion of the animal stunner 10 having a catch is shown in detail in FIGS. 7 and 8. The forward and rearward directions described herein are with respect to the stunner front end 14, and inward and outward directions described herein are with respect to the longitudinal axis 42. A piston 48 surrounded by an O-ring seal 66 slides within an inner cylindrical chamber 180 forward and rearward along axis 42, and carries stunning rod 40. The rearward end of stunning rod 40 ends in an outward extending lip 46 that is alternately held and released by catch 20, and the forward end of the stunning rod extends through head contact 18 to be driven toward the animal's head when the catch releases the stunning rod lip 46.

Figure 25:
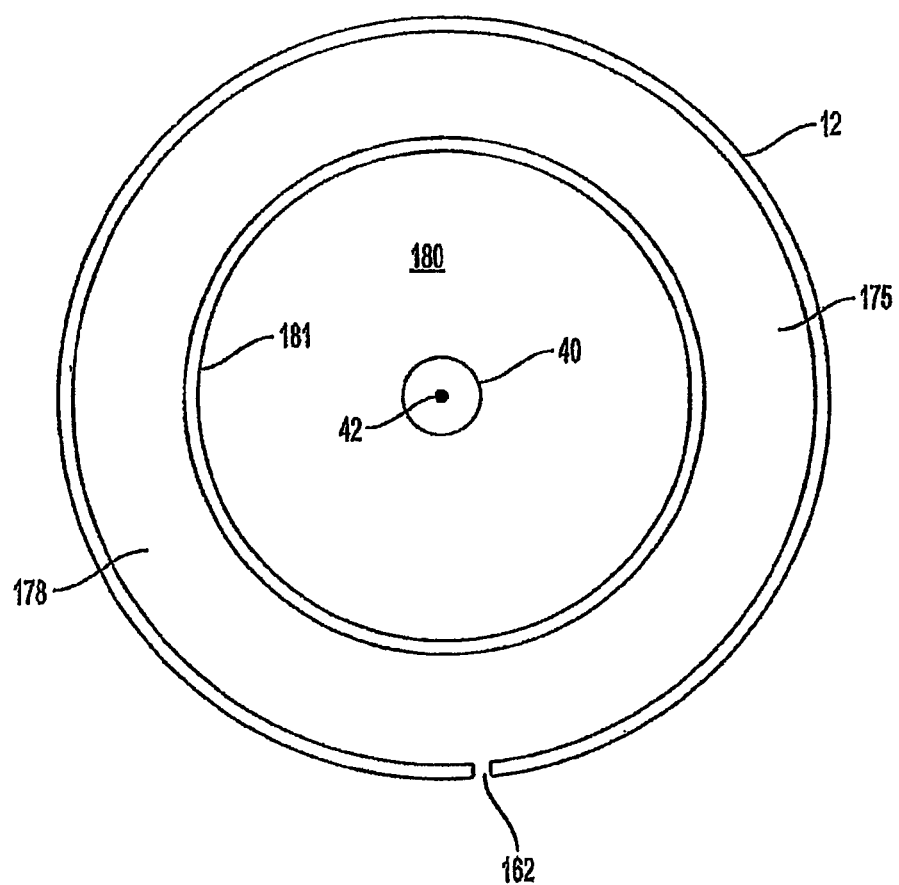
FIG. 25 is a partial cross sectional view of the housing of the stunner of FIGS. 3-6 normal to its longitudinal axis, showing the inner and return air chambers along lines 25-25 of FIGS. 3-6.

Stunner 10 may be operated by pressurized fluid, such as compressed air for the example shown. Outward of and shown as surrounding inner chamber 180 adjacent its central portion and rearward end is annular cylindrical first pressure or fire chamber 170. Compressed air can move freely and quickly between fire chamber 170 to the region of inner chamber 180 behind piston 48 upon operation of main valve 165. As shown in FIG. 25, annular cylindrical second pressure or return chamber 175 is also adjacent to, and shown as surrounding inner chamber 180 adjacent its central portion and forward end in the example of FIGS. 3-6. A catch piston chamber 188 is located adjacent and around catch piston 50, which itself holds and releases catch 20. Chambers 170, 175, 180 and 188 may be pressurized to operate the stunner shown, as will be described in more detail below.

A first or main trigger 146 in main handle 136 is used to control a main handle valve 142 to the pressurized fluid, compressed air as used herein, to initiate the sequence that fires the stunning rod. For purposes of safety, to operate the exemplary stunner shown there are two additional conditions that must be met before the catch mechanism for the stunning rod is released. The head contact activator 18 located at the front of the tool must be in contact with the animal to receive the stroke and a second or auxiliary trigger 114 in auxiliary handle 110, which may be mounted at the rear of housing 12 perpendicularly to axis 42, must be manually operated. Although it is possible to construct and operate the stunner with only one of these three, at least two, and preferably all three, should be employed for safety.

Figure 87:
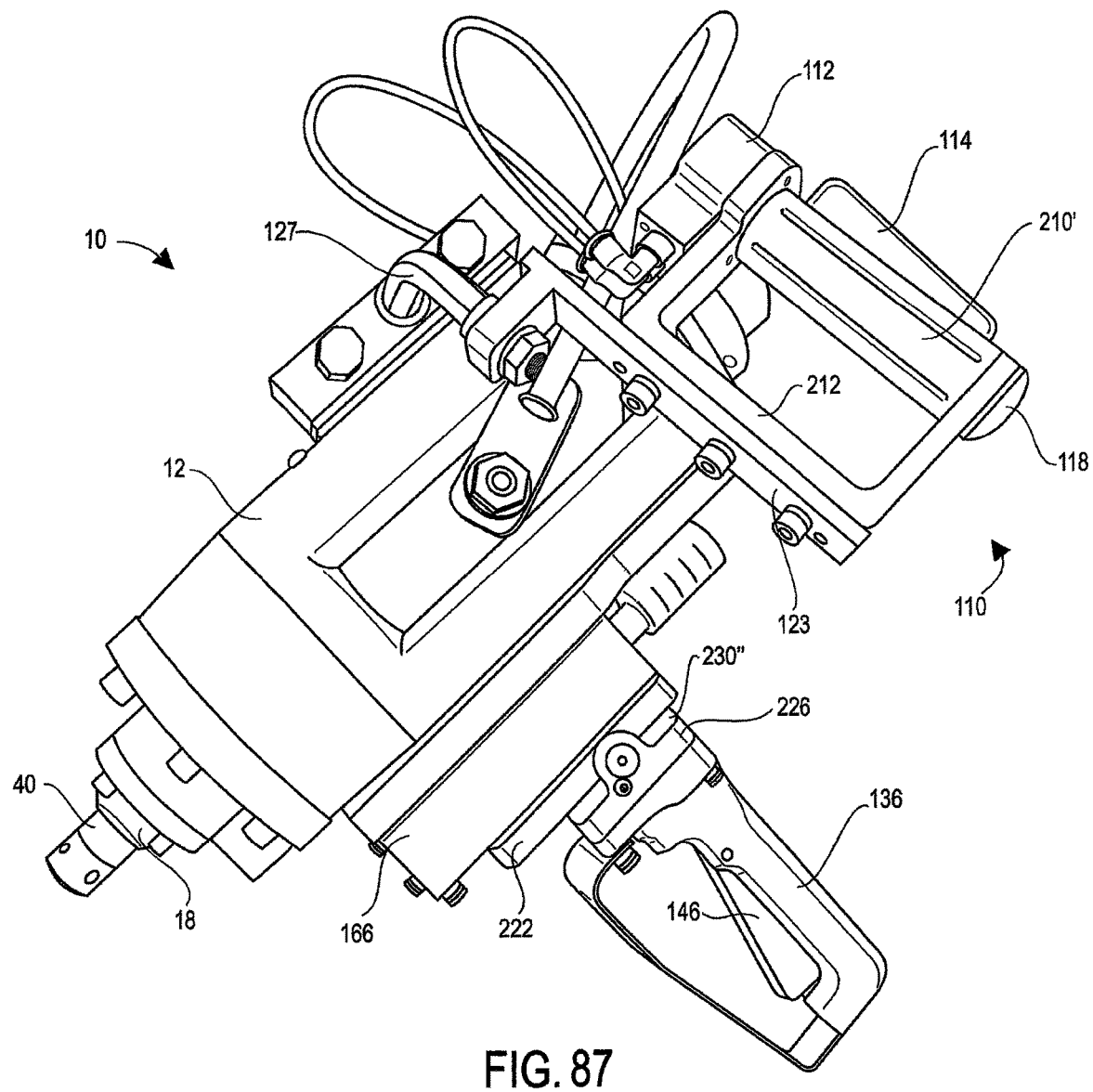
FIG. 87 is a perspective view of an embodiment of the stunner of the present invention using a cushion mount for the main handle and an auxiliary handle.

Alternatively, the auxiliary handle 110 may be secured onto the housing 12 via a bracket arm 127 extending from a side of the housing 12, such as on the top side (FIG. 87). The bracket arm 127 attaches to and secures a handle mounting bracket 123. The handle mounting bracket 123 includes a plurality of openings which line up with openings on the auxiliary handle bracket 212 when the handle bracket 212 is disposed adjacent the planar surface of the handle mounting bracket 123. Instead of the construction shown in FIG. 87, where the auxiliary handle bracket 212 is mounted directly to the handle mounting bracket 123, one or more anti-shock cushions may be provided for the auxiliary handle. As shown in FIGS. 77 and 82-86, handle bolts 125 extend through the openings in the handle mounting bracket 123 and handle bracket 212 and hold these two brackets together after lock nuts 126 are installed and tightened on the bolts 125. Handle cushions 124*a*, 124*b* may be disposed on one or both sides of the handle mounting bracket 123 to provide shock-absorbing properties when operating the stunner 10. An end plate 122 may also be affixed on the bottom side of the handle mounting bracket 123 by the handle bolts 125. Each cushion 124 may be made of rubber or other flexible polymer, and are shown as being rectangular with a desired thickness. Each cushion 124 has a flat surface, and the flat surfaces of cushions 124*a* and 124*b* are placed against the opposite sides of handle mounting bracket 123. Extending from the opposite surface of each cushion 124 are a plurality of spaced projections or bosses 129 that are square except for concave side edges facing each other. As shown in the embodiment, two full square bosses are provided in the central portion, and two half-sized bosses are provided at the opposite ends of the cushion. Three openings 130 are disposed between adjacent bosses for bolts 125. These full and half-size bosses 129 of cushions 124*a*, 124*b* are received into comparably sized openings 131 in the adjoining surfaces of handle bracket 212 and end plate 122, respectively, and mounting bracket 123 is sandwiched between cushions 124*a*, 124*b* when assembled.

Figure 78:
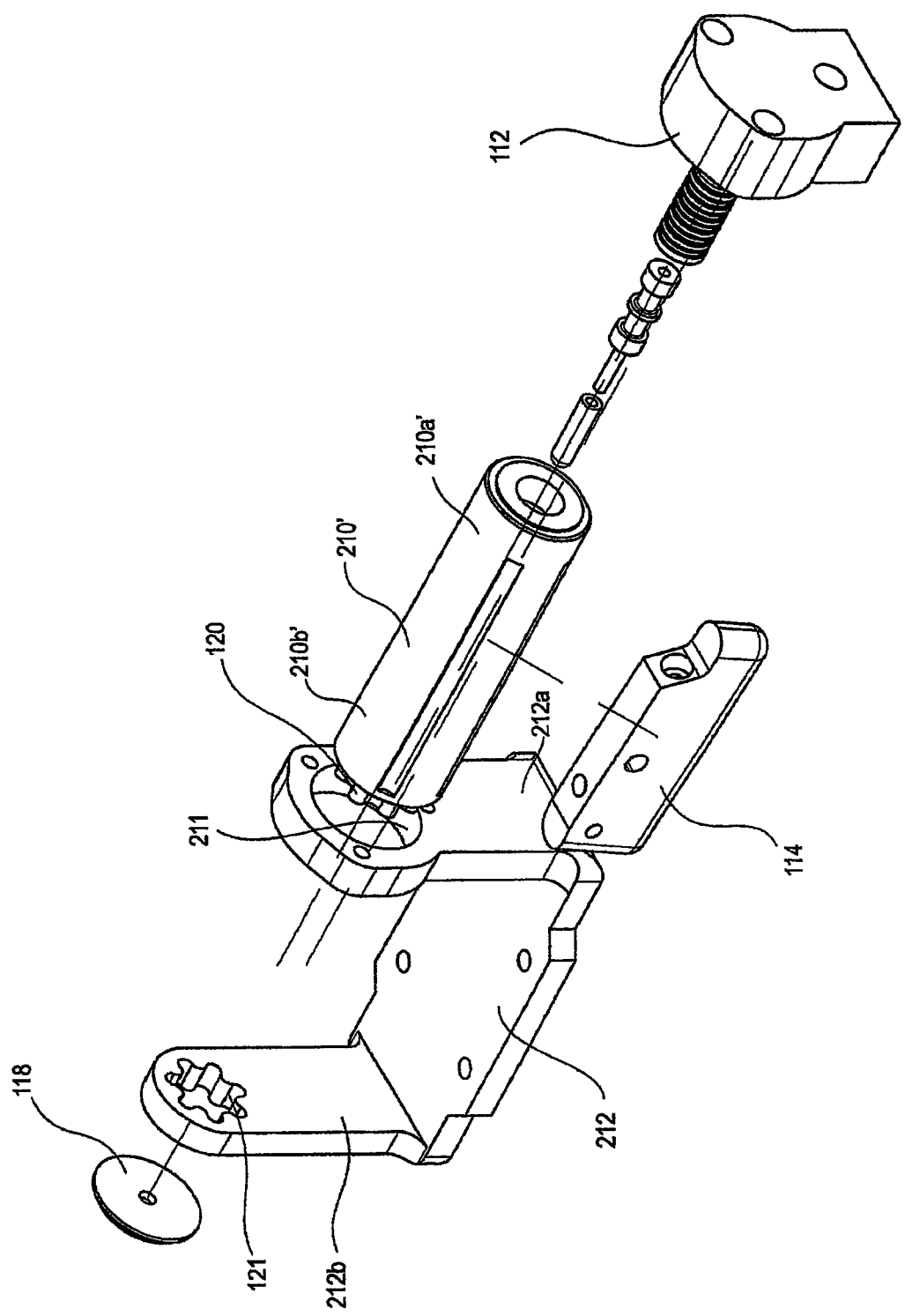
FIG. 78 is an exploded top perspective view of the auxiliary handle embodiment of FIG. 77.

An embodiment of the auxiliary handle system 110' allows for manual re-positioning of auxiliary trigger 114 by rotation of the handle 210', as shown in FIGS. 78-81. Cylindrical auxiliary handle 210' includes auxiliary trigger 114 extending from a side thereof, which pivots when depressed to activate auxiliary handle valve 112 mounted on the outside of arm 212*a* of handle bracket 212. Opposite ends 210*a*' and 210*b*' of auxiliary handle 210' are secured to parallel bracket arms 212*a* and 212*b*. Extending axially from handle end 210*b*' are splines 120, which comprise a plurality of spaced axial keys projecting radially outwardly from the handle longitudinal axis, which splines are machined into or attached to the handle shaft (FIG. 78). Corresponding spaced grooves extending radially outwardly from the longitudinal axis are formed in a bore 121 of bracket arm 212*b*, so that bore 121 mates with splines 120 on the handle 210'. Splines 120 perform the same function as a key in fixing the relative position of auxiliary handle 210' and auxiliary trigger 114 with respect to the handle bracket 212 and the stunner housing 12. Alternatively, any projection on one of the auxiliary handle and bracket mating with a corresponding opening on the other of auxiliary handle and bracket may be used. To adjust the position of auxiliary trigger 114, valve 112 and auxiliary handle washer 118 are first removed from the opposite outside edges of mounting bracket arms 212*a*, 212*b* respectively (FIGS. 77 and 78), typically by using an Allen key or screwdriver to unscrew bolts extending through the washer 118 and arm 212*b*, and through the valve 112 and arm 212*a*. Once the washer 118 and valve 112 are removed from the auxiliary handle 210', handle end 210*a*' may freely slide along its longitudinal axis through opening 211 (FIG. 78) in bracket arms 212*a* (FIG. 81). Sliding the handle shaft 210' in a direction away from bracket arm 212*b* disengages splines 120 from the grooves in bore 121 of bracket arm 212*b*. Handle shaft end 210*a*' traverses from within the inside edge of bracket arm 212*a* to the outside edge of bracket arm 212*a* when sliding the handle shaft 210' in a direction away from bracket arm 212*b*.

Once the handle 210' is pulled away from bracket arm 212*b* so that splines 120 are removed from opening 121 and exposed, the handle may be rotated clockwise or counter-clockwise along its longitudinal axis to reposition trigger 114 in a different position relative to bracket 212 and stunner housing 12. End users may adjust the handle shaft so that trigger 114 points inward toward the housing 12 of the stunner 10 (FIG. 79), or outward away from the housing 12 (FIG. 80), or any other desired position. After handle 210' is rotated to place trigger 114 in the desired position, the handle splines 120 may be reinserted into and reengaged with the grooves in spline bore 121 by pushing the handle shaft 210' in a direction towards bracket arm 212*b*. Re-installation of washer 118 and valve 112 onto the ends of bracket arms 212*b*, 212*a*, respectively, will secure handle 210' in place and prevent any further rotational movement, thus maintaining the desired position of trigger 114.

Figure 26:
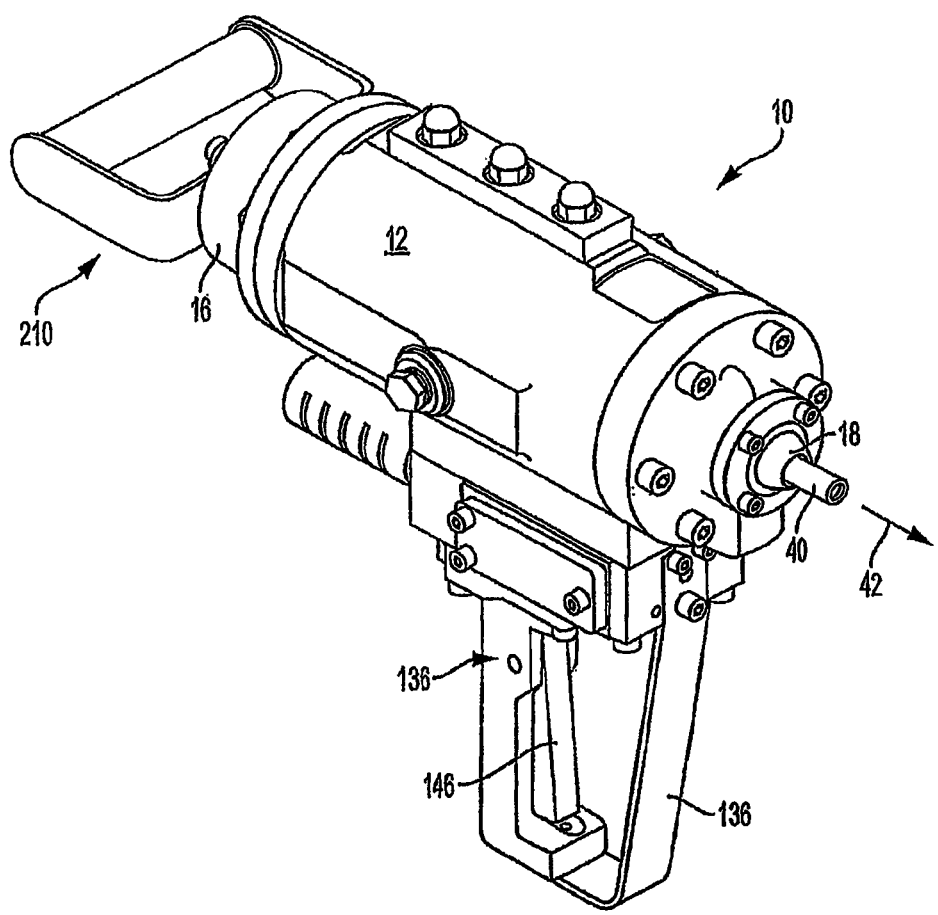
FIG. 26 is a perspective view of another embodiment of the stunner of the present invention, without the auxiliary trigger in the rear handle.
Figure 27:
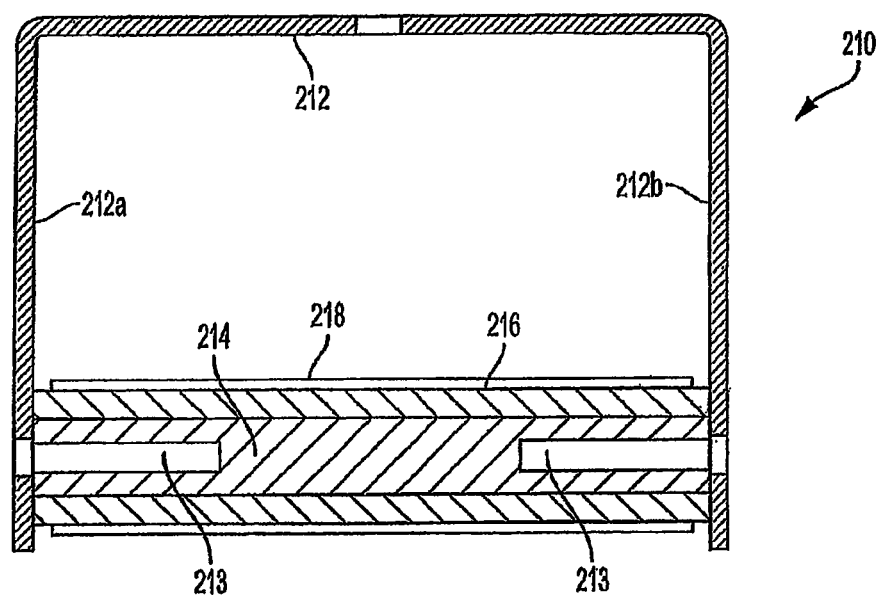
FIG. 27 is a cross sectional view of the handle grip of the stunner of FIG. 26.

An embodiment of the present invention employing main trigger 146, controlling main handle valve 142, and head contact activator 18 is shown in FIG. 26. In this embodiment, a second or auxiliary trigger is not provided, and instead a grip handle 210 is positioned at the tail end 16 of housing 12. Grip handle 210 as shown in FIG. 27 comprises a mounting bracket 212 and an inner handle bar 214 secured by a pair of connecting rods 213 extending inwardly from a pair of mounting bracket arms 212a, 212b. A flexible mount 216 of rubber or other polymer surrounds inner bar 214 to provide cushioning to outer handle tube 218 disposed thereover. In this embodiment the operator may hold grip handle 210 in one hand while holding main handle 136 in the other. While depressing and holding trigger 146 in main handle 136, the operator may then displace head contact activator 18 against the head of the animal to fire the stunning rod.

Figure 3:
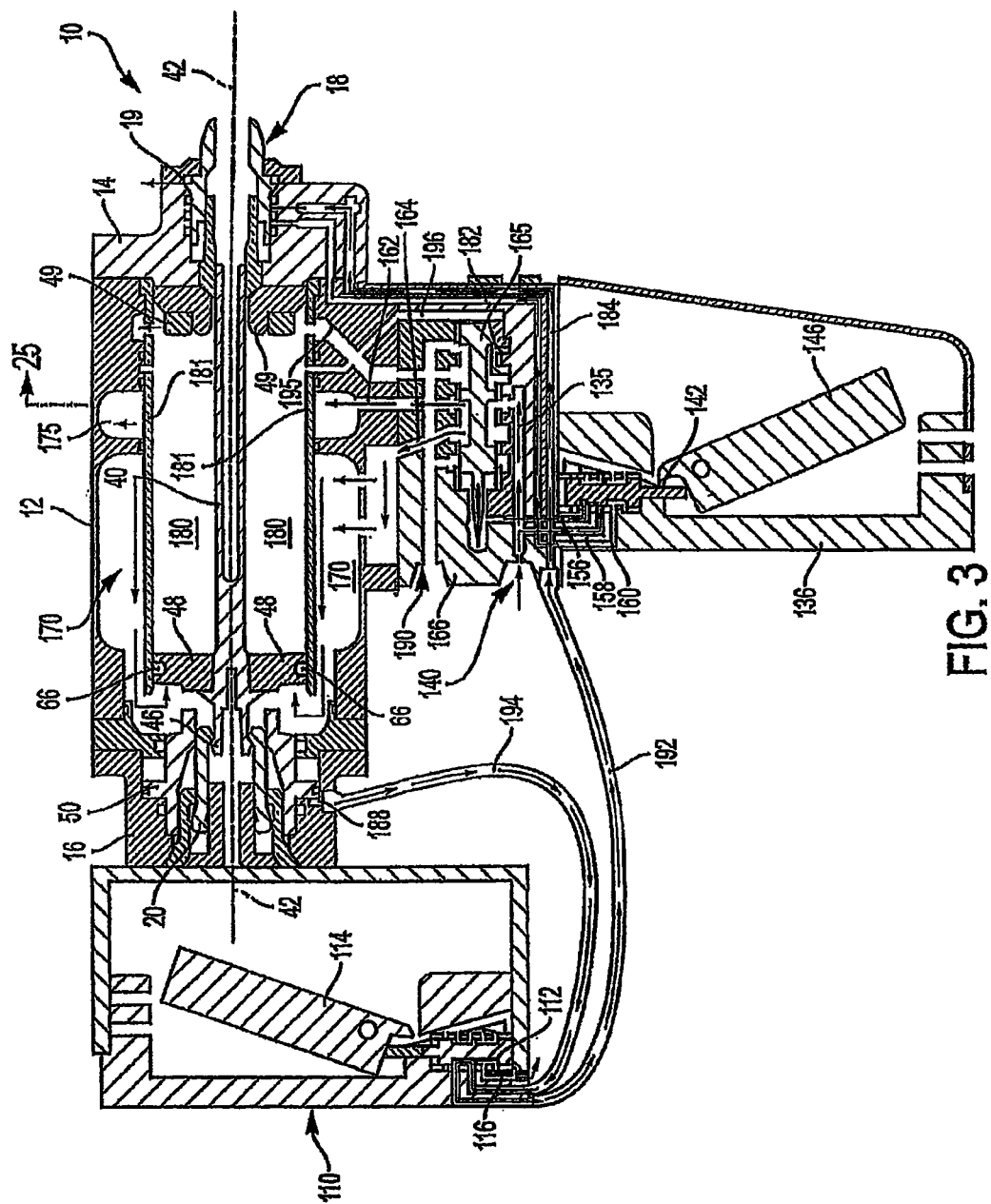
FIG. 3 is a side cross-sectional view of an animal stunner with the catch hold position, with valves in neutral position, with the air supply pressurized and prior to firing, according to the present invention.

FIG. 3 shows the animal stunner 10 with the catch 20 hold position, with valves in the neutral position, and with the air supply pressurized and prior to firing. An air hose (not shown) is attached to the supply port 140 on the main chamber valve body 166, and main valve body 166 is pressurized by the compressed air. Main valve 165 within valve body 166 is positioned to the right by spring (not shown) pressure and pressure force conveyed from air passages 158 (connected to supply port 140) through the main handle valve 142 and then through passageway 156. The main valve spool 165 in this position will simultaneously pressurize, via passageways 135, 162 and 164, the fire chamber 170 and also the smaller return chamber 175, both at a slower fill rate. The stunning rod piston 48 is fully pressurized by air flow from fire chamber 170 behind the piston, and retained from movement by the closed catch 20 assembly holding stunning rod lip 46, as will be explained further below. The main handle valve 142 is in the neutral position and not yet activated by main trigger 146, and valve 142 is extended by spring (not shown) pressure downward, so that the air passage via passageway 184 to the head contact 18 is vented through the main handle valve 142. The head contact 18 is extended by spring (not shown) pressure forward (rightward). Any air pressure on the extend side of the catch piston 50 in chamber 188 is vented via passageways 194 through the auxiliary handle vent 116, and any air pressure in passageway 192 is vented via passageway 184 through the head contact vent 19. The area under and behind the stunning rod piston 48 is vented through the main valve body 166 into the exhaust port 190. The stunner will not fire in this position, wherein main trigger 146, auxiliary trigger 114 and head contact 18 are not depressed.

Figure 4:
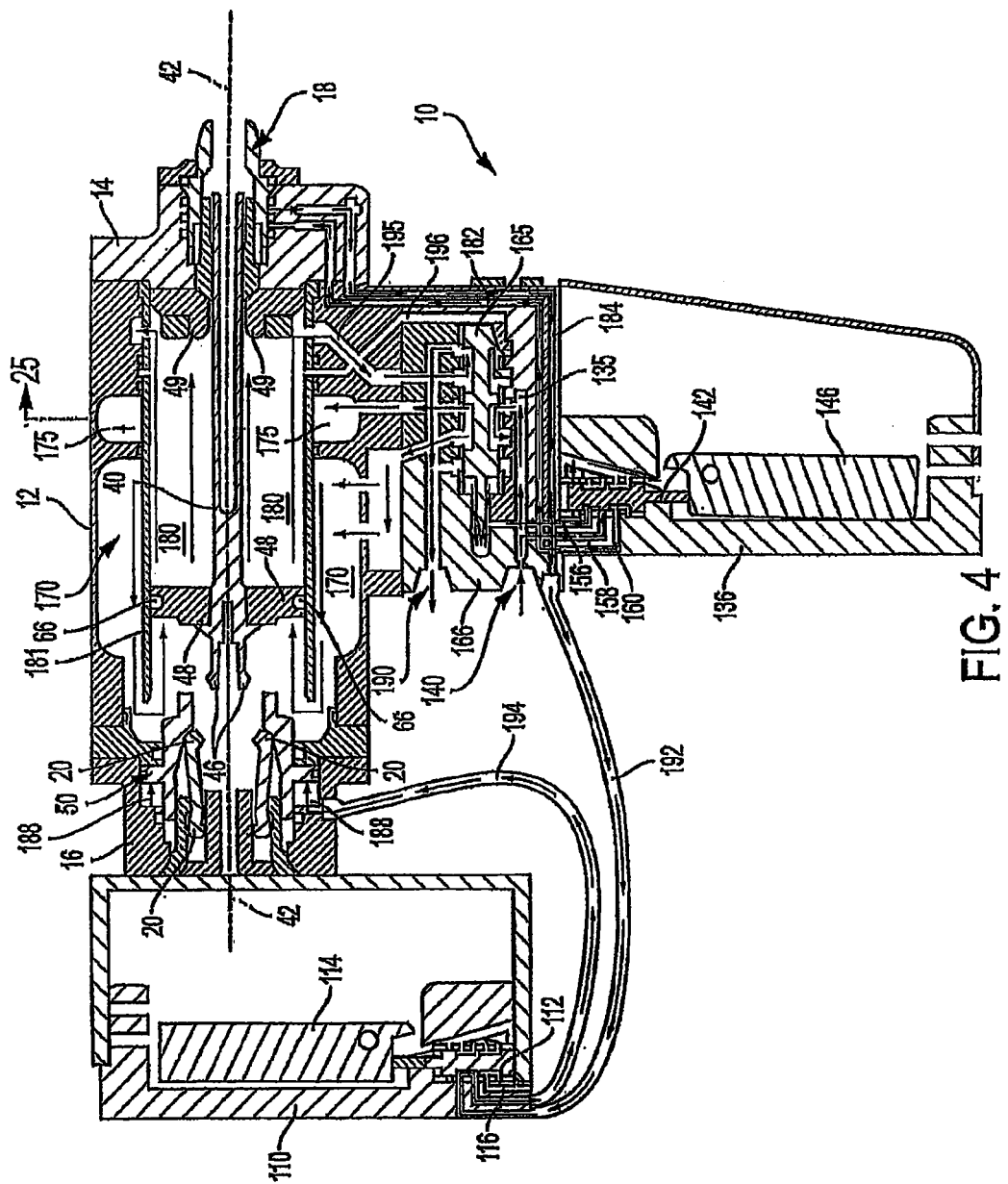
FIG. 4 is a side cross-sectional view of the animal stunner of FIG. 3 with the catch release position, with valves in the firing position, according to the present invention.

FIG. 4 shows the animal stunner with the catch 20 release position, with valves 142, 165, 112 and 18 in the firing position. To commence the firing sequence, the main handle valve 142 is activated by the operator depressing main trigger 146 with one hand, head contact 18 is activated by the operator pressing against the animal's head to move the contact rearward (leftward), and auxiliary handle valve 112 is activated by the operator depressing auxiliary trigger 114 with the other hand. As the main handle valve moves into the upward position, air passage from the main handle valve 142 to main valve spool (spring end) is exhausted via passageway and air passage from the main handle valve 142 to head contact 18 is pressurized via passageway 182. Compressed air also flows via air passage 194 to the catch piston cylinder chamber 188 after flow through the head contact valve 18, passageway 184 and passageway 192 through the auxiliary handle valve 112. As a result of head contact 18 being depressed and auxiliary handle valve 112 being pressurized, catch piston 50 is moved by the compressed air in chamber 188 and extends forward (rightward) to its limit and opens the catches 20. As a result, stunning rod 40 is released and moves forward (rightward) at a high rate of speed, while the air in chamber 180 under and forward of the stunning rod piston 48 is exhausted through passageway 195 and the main valve body 166 exhaust port 190.

Figure 5:
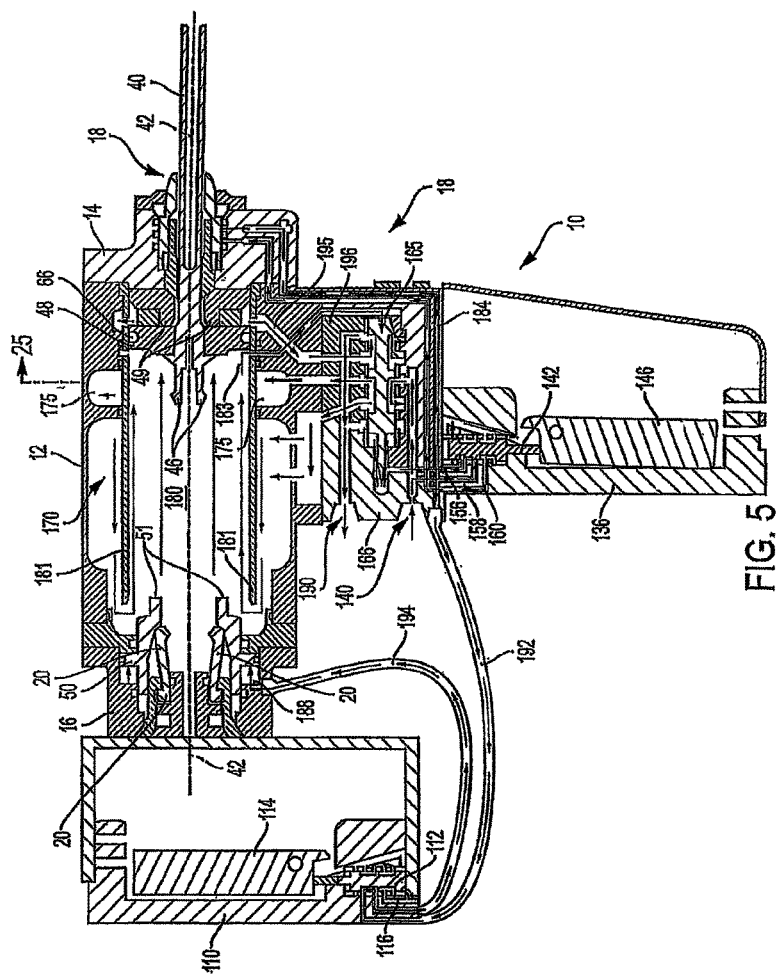
FIG. 5 is a side cross-sectional view of the animal stunner of FIG. 3 with the stunning rod in the end-of-stroke position, according to the present invention.

FIG. 5 shows the animal stunner 10 with the stunning rod 40 in the full forward, end-of-stroke position. The stunning rod stroke is stopped by the annular cushions 49 next to and inside of the nose housing 14. In this position the stunning rod piston seal 66 extends forward and beyond the small rod holes 183 in the liner 181 of chamber 180 allowing air flow into the main valve reverse passage 196 to the bottom (rightward) end of the main valve spool 165. As main valve 165 is pressurized, the spool commences moving upward (leftward) against the pressure of the spring to reverse the flow of air to the stunning rod piston 48.

Figure 6:
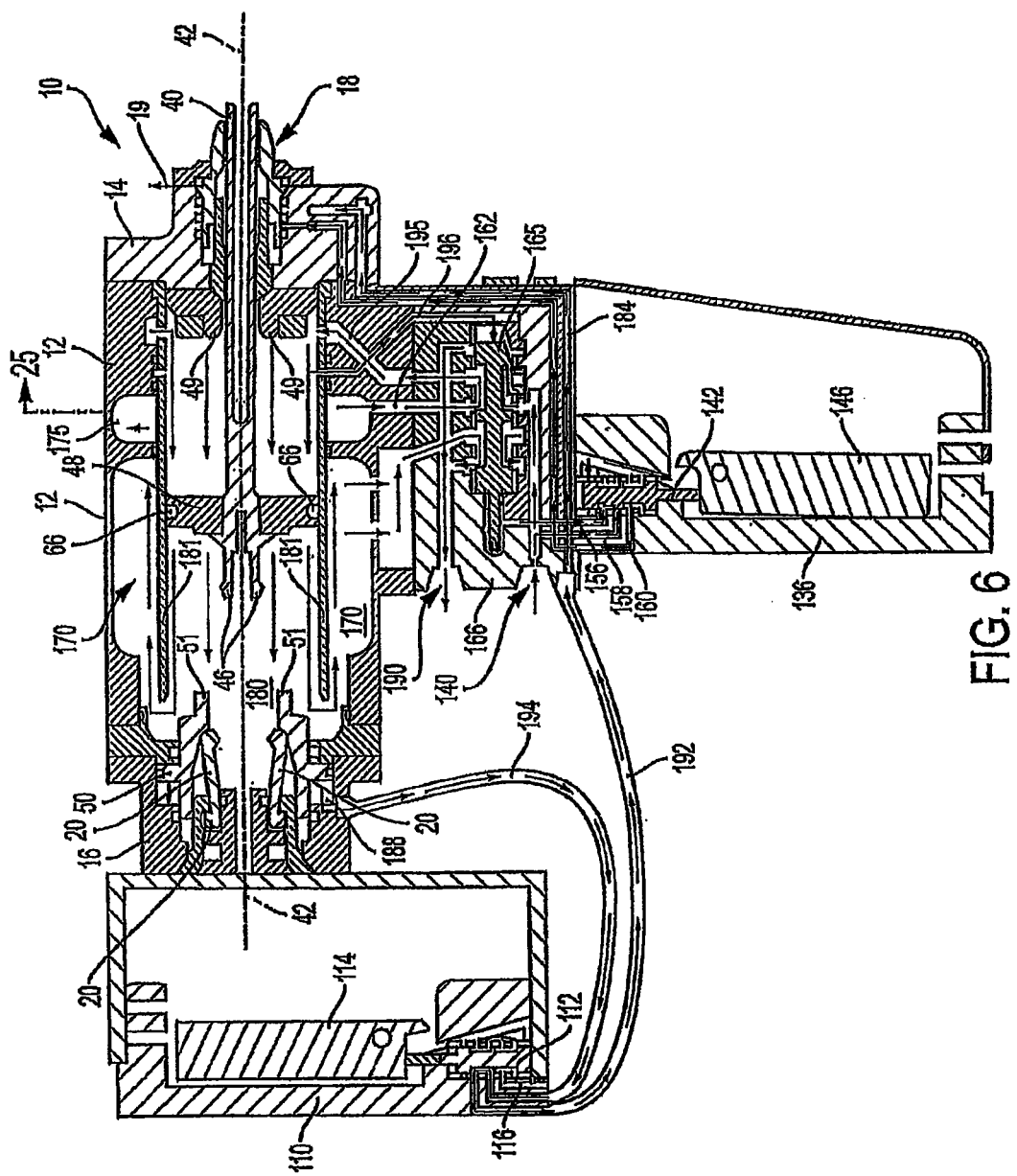
FIG. 6 is a side cross-sectional view of the animal stunner of FIG. 3 with the air in main valve in the reverse position to retract the stunning rod, according to the present invention.

FIG. 6 shows the animal stunner near the end of the firing sequence with the air in main valve 165 moved into the reverse position to retract the stunning rod, as a result of compressed air flow from reverse passage 196 (FIG. 5). Both main handle valve 142 and auxiliary handle valve 112 are still depressed and activated, but head contact 18 is released from the animal's head so that contact valve 18 returns to the forward (rightward) position. Main valve 165 reverse passage 196 is pressurized forcing the main valve spool to move upward (leftward) against the pressure of the spring, so that the main valve body air flow is reversed. As this occurs, fire air chamber 170 is exhausted through the main valve body 166 into the exhaust port 190, and air flow is reversed via passage 194 from the catch piston 50 chamber 188 through open auxiliary handle valve 112, passageways 192 and 184 and out through the head contact 18 vents 19 when the head contact 18 is released. The compressed air pressure immediately available from the return chamber 175 causes pressurized air to move freely and quickly flow via passageways 162 (FIGS. 6 and 25), main valve 165 and passageway 195 into the forward (rightward) end of chamber 180 (FIG. 6). Although return chamber 175 is volumetrically smaller and contains less pressurized fluid than fire chamber 170, it is sized to provide sufficient air to drive piston 48 and stunning rod 40 rearward. This use of compressed air from adjacent return chamber 175 reduces the volume of air needed as compared to prior art methods where the air to return the piston is supplied via internal passageways from the supply port. Instead of relying on a short, higher pressure blast of compressed air through the supply port at the same time the piston return cycle is initiated, the present invention pre-supplies the compressed piston return air at the same time the fire chamber is pressurized, during the longer time available between operation cycles. This permits restriction orifices of desired sizes to be used at the supply port 140, thereby saving on total air volume usage by the stunner.

The pressurized air in chamber 180 forward end retracts the stunning rod 40 rearward (leftward) as shown in FIG. 6 until piston 48 contacts the forward end 51 of catch piston 50. As a result of the piston striking it, the catch piston 50 is retracted rearward (leftward) into the catch cylinder 188, which closes the catches 20 by forcing them inward to capture stunning rod lip 46, so that the stunning rod 40 is retained by the catches, as shown in FIG. 3.

When the main handle valve 142 is returned to neutral as a result of main trigger 146 being released and in the undepressed position (FIG. 3), air passage to main valve spool (spring end) is again pressurized, and shifts valve 165 to its original position. Both fire chamber 170 and return chamber 175 are again pressurized, air passage to the nose is exhausted via vent 19, auxiliary handle valve 112 returned to neutral as a result of auxiliary trigger 114 being released, any pressure is vented through vent 116 of the auxiliary handle valve 112, so that air passage to the catch piston 50 is vented two ways for safety, and will not fire again until the firing sequence is again started. The order of firing sequence makes no effect on the performance, and both triggers 146, 114 and the head contact 18 must be activated in any order before firing will occur in this embodiment.

Figure 28:
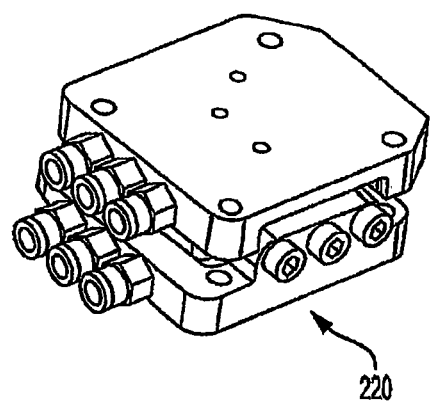
FIG. 28 is a perspective view of an embodiment of a mount employed between the main handle and main valve body of the stunner of the present invention.
Figure 29:
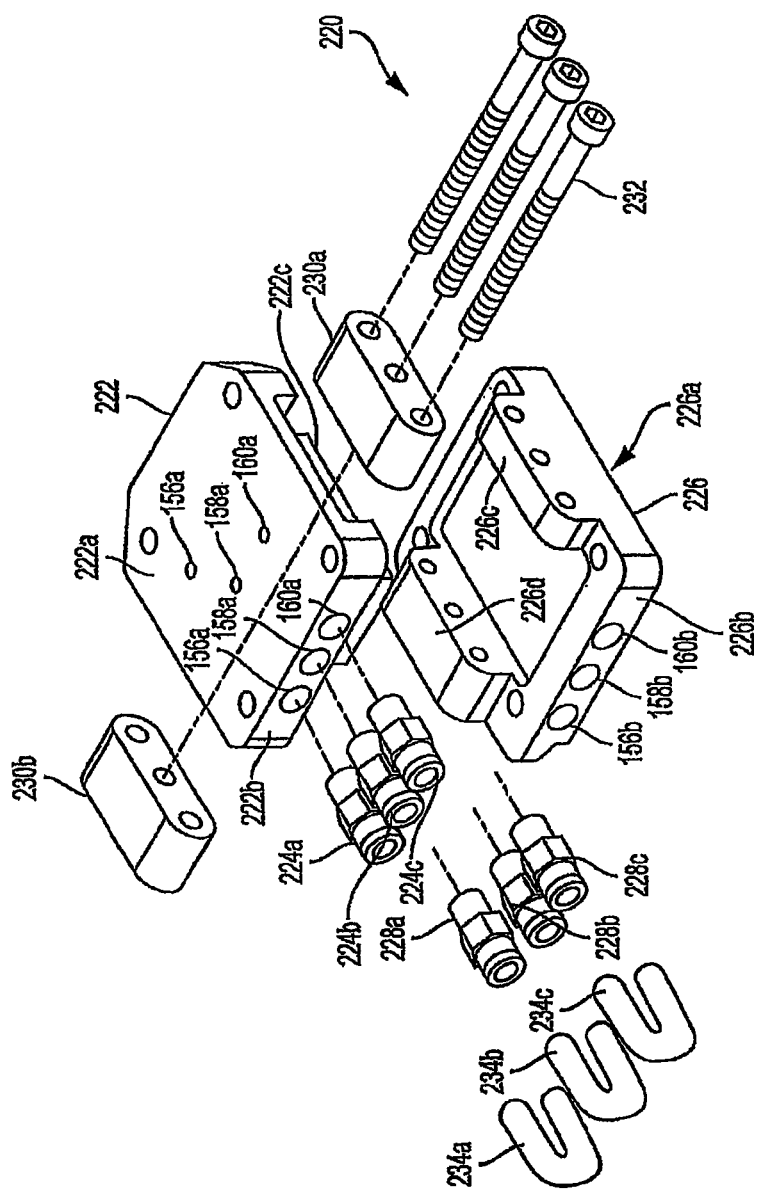
FIG. 29 is an exploded perspective view of the handle mount of FIG. 28
Figure 30:
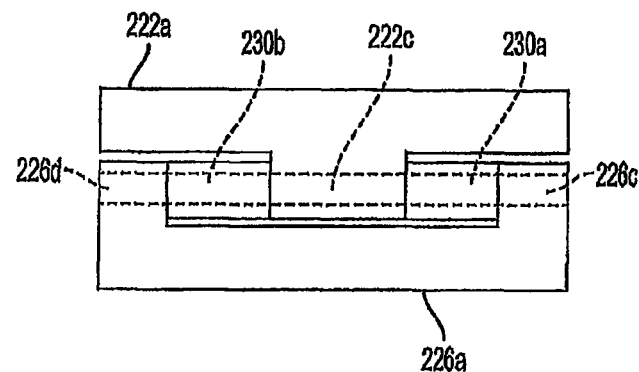
FIG. 30 is a cross sectional view of the mount of FIG. 28 showing the anti-shock members.

Main handle 136 is shown in FIGS. 3-6 as being secured directly to main valve body 166. To provide cushioning to mitigate any shock due to the firing of the stunning rod, and therefore reduce operator injury and increase operator comfort, there may be provided a cushion mount for main handle 136. Such a mount 220 is shown in FIGS. 28-30 for insertion between main handle 136 and main valve body 166 at the lower end of housing 12. Cushion mount 220 includes a first or upper portion 222, which is connected or otherwise secured to the lower side of housing 12, and a second or lower portion 226, which is connected or otherwise secured to the upper end of main handle 136. Upper portion 222 includes passageways 156a, 158a, 160a which mate at upper surface 222a with passageways 156, 158, 160, respectively, (FIGS. 3-6) opening from the lower end of main valve body 166. Passageways 156a, 158a, 160a connect through upper portion 222 at side surface 222b with fittings 224a, 224b, 224c, respectively. In lower portion 226 passageways 156b, 158b, 160b mate at lower surface 226a with passageways 156, 158, 160, respectively, (FIGS. 3-6) opening from the upper end of main handle 136. Passageways 156b, 158b, 160b connect through lower portion 226 at side surface 226b with fittings 228a, 228b, 228c, respectively. Hoses or tubes 234a, 234b, 234c connect fittings 224a, 224b, 224c with fittings 228a, 228b, 228c, respectively.

Between mount upper portion 222 and a lower portion 226 there are provided a pair of anti-shock members 230a, 230b, which may be made of rubber cushions or other flexible polymer. Anti-shock members 230a, 230b may be in the configuration of elongated blocks (i.e., parallelepipeds) or other shapes disposed on either side between a central flange 222c extending downwardly from upper portion 222, and a pair of side flanges 226c, 226d extending upwardly from lower portion 226. One or more fasteners 232, here shown as three bolts, may extend in the same direction as or normal to longitudinal axis 42 into and through corresponding aligned openings in side flange 226c, anti-shock member 230a, central flange 222c, anti-shock member 230b and side flange 226d. The major surfaces of members 230a, 230b are contained in planes parallel to the longitudinal axis 42 of the housing 12. Except for the fasteners, anti-shock members 230a, 230b completely isolate mount upper portion 222 from mount lower portion 226, and absorb vibration and shock transmitted from the body of stunner 10 to main handle 136.

Figure 31:
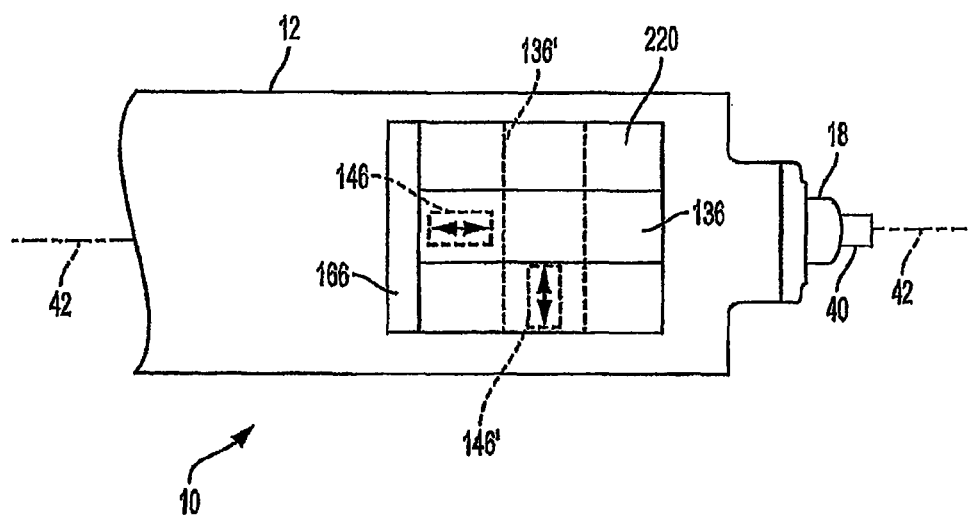
FIG. 31 is a bottom view of an embodiment of the main handle and mount of the stunner of the present invention, showing different fixed orientations of the main handle and trigger.

With or without the anti-shock members, mount 220 may be provided in different patterns of passageways 156a, 158a, 160a and/or passageways 156b, 158b, 160b, to connect to the main handle 136 and/or main valve body 166 at different orientations than the conventional one shown in the drawings, where the trigger 146 movement is aligned with the longitudinal axis 42 of the stunner housing 12. As shown in FIG. 31, this would permit handle 136 and trigger 146 movement to be mounted to main valve body 166 or housing 12 in a different fixed position and aligned to an orientation other than that of stunner longitudinal axis 42, for example, with handle 136' and trigger 146' movement in a direction 90° to axis 42. The different main handle orientations may accommodate different layouts in the plant operations or operator comfort, for example, due to pneumatic activation instead of mechanical activation of the valve with the trigger.

Figure 57:
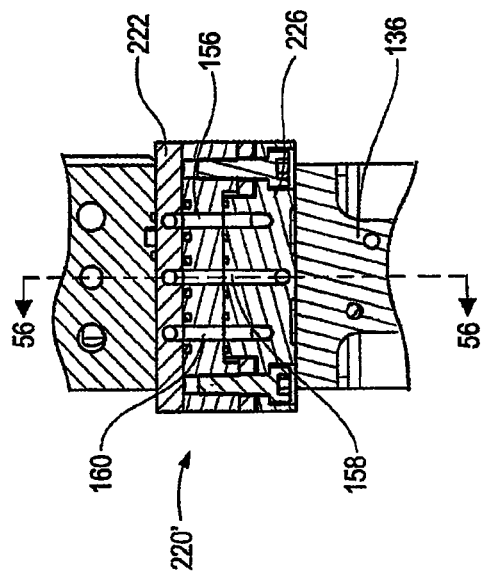
FIG. 57 is a rear cutaway view of the handle mount embodiment of FIG. 49 installed on the stunner, along lines 57-57 of FIG. 56.
Figure 56:
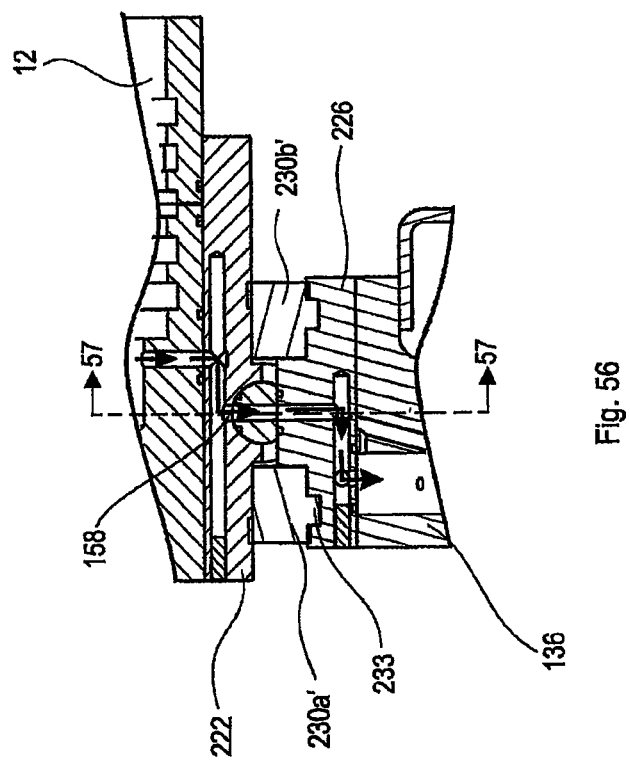
FIG. 56 is a side cutaway view of the handle mount embodiment of FIG. 49 installed on the stunner, along lines 56-56 of FIG. 57.
Figure 70:
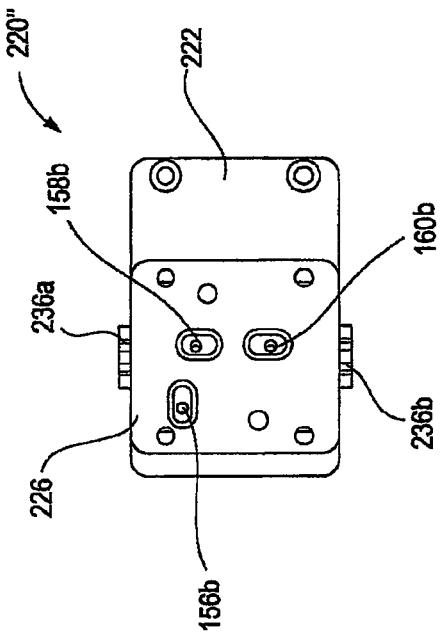
FIG. 70 is a top view of the handle mount embodiment of FIG. 66.
Figure 72:
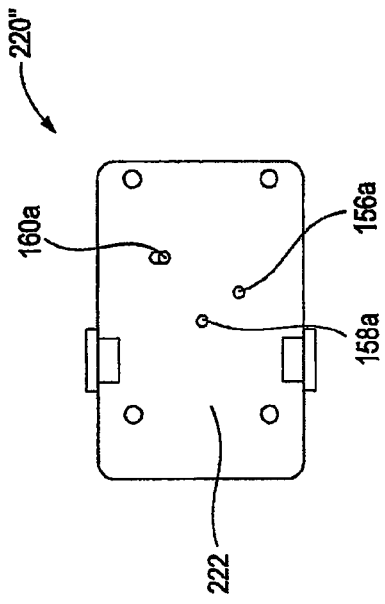
FIG. 72 is a bottom view of the handle mount embodiment of FIG. 66.
Figure 69:
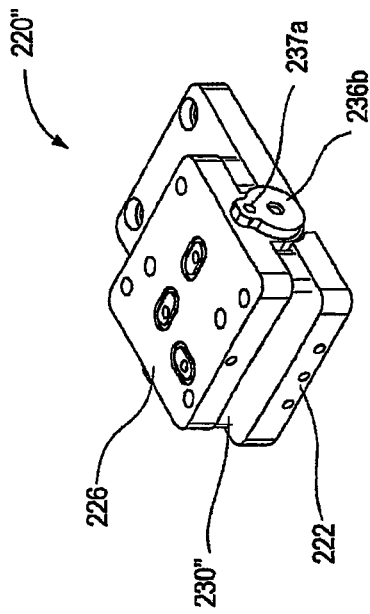
FIG. 69 is a rear perspective view of the handle mount embodiment of FIG. 66.

An alternate embodiment of the mount 220' is shown in FIGS. 49-65 for insertion between main handle 136 and main valve body 166 at lower end of housing 12. This mount embodiment 220', which is shown inverted, includes a first or upper portion 222, which is connected or otherwise secured to the lower side of housing 12, and a second or lower portion 226, which is connected or otherwise secured to the upper end of main handle 136. Upper mount portion 222 includes passageways 156a, 158a, 160a which mate with passageways 156, 158, 160, respectively, opening from the lower end of main valve body 166 (FIGS. 3-6). In lower mount portion 226 passageways 156b, 158b, 160b mate with passageways 156, 158, 160, respectively, (FIG. 57) opening from the upper end of main handle 136 (FIGS. 3-6). In this cushion mount embodiment 220', upper portion 222 passageways 156a, 158a, 160a connect to lower portion 226 passageways 156b, 158b, 160b through passageways 156c, 158c, 160c, respectively, in central pin 236 (FIGS. 49, 56 and 57).

Figure 49:
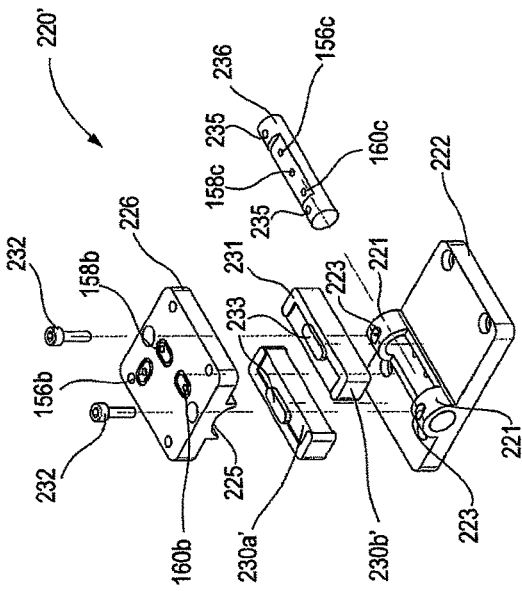
FIG. 49 is an exploded top perspective view of an alternate embodiment of the handle mount of FIG. 28 employed between the main handle and main valve body of the stunner of the present invention.
Figure 51:
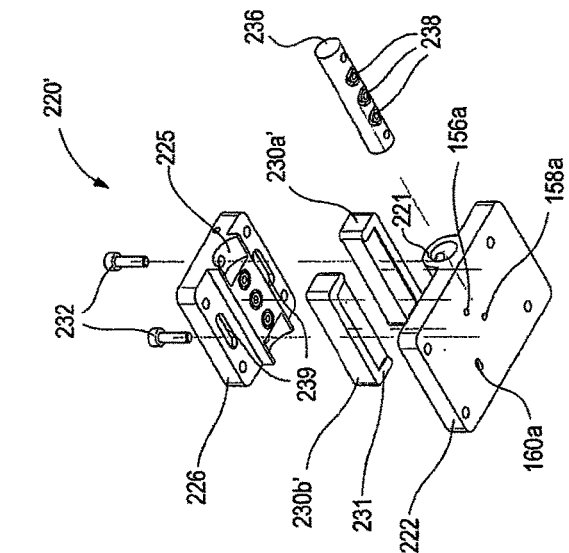
FIG. 51 is an exploded bottom perspective view of the handle mount embodiment of FIG. 49.
Figure 50:
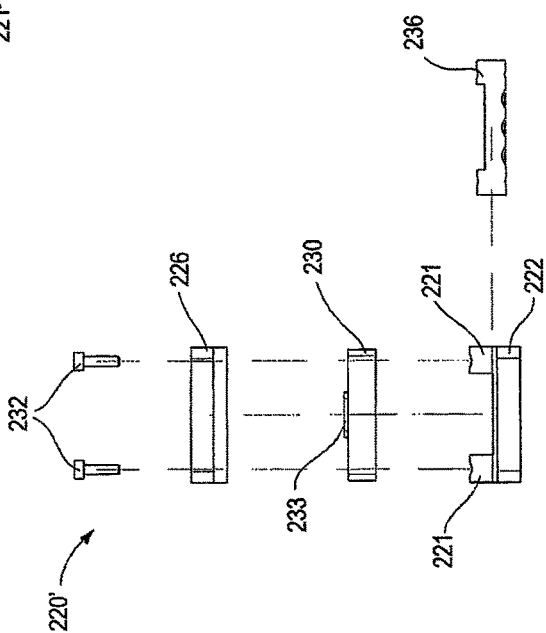
FIG. 50 is an exploded front view of the handle mount embodiment of FIG. 49.
Figure 53:
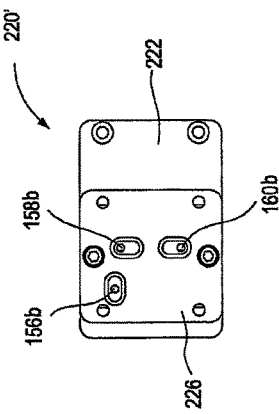
FIG. 53 is a top view of the handle mount embodiment of FIG. 49.
Figure 55:
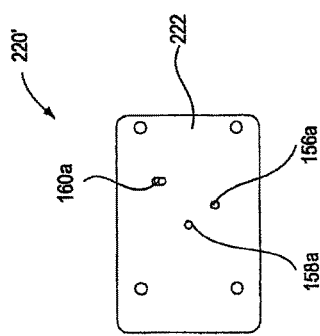
FIG. 55 is a bottom view of the handle mount embodiment of FIG. 49.
Figure 52:
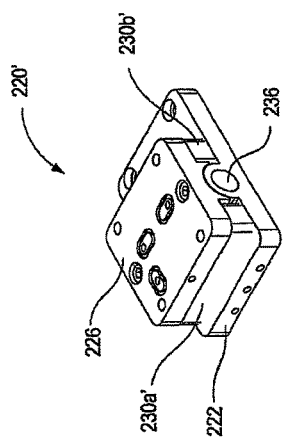
FIG. 52 is a top perspective view of the handle mount embodiment of FIG. 49.
Figure 54:
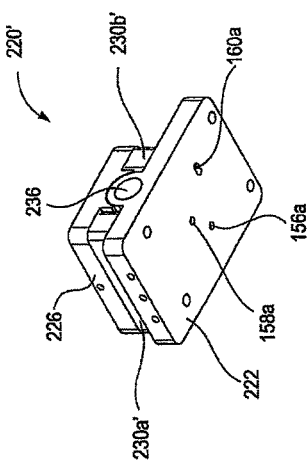
FIG. 54 is a bottom perspective view of the handle mount embodiment of FIG. 49.

Central pin 236 is disposed between upper mount portion 222 and lower mount portion 226 along a central axis to secure the upper portion 222 and lower portion 226 together, and permits a pivoting motion between the mount portions 222, 226 (FIGS. 49-51). Pin 236 is rotatably held in openings in cylindrical flanges 221 on opposite edges of upper mount 222. Passageways 156c, 158c, 160c are spaced along the length of central pin 236, with each passageway being sealed at its end to the corresponding upper and lower mount passageway by an O-ring 238, on the pin 236 and the lower mount 226 (FIG. 51). This creates an air-tight seal for each passageway 156, 158, 160 running through mount upper portion 222, central pin 236, and mount lower portion 226 (FIGS. 49-51) to provide for flow of the pressurized fluid. Between mount upper portion 222 and mount lower portion 226 there is provided a pair of anti-shock members 230a', 230b', as shown in FIGS. 58-59, which may be made of rubber cushions or any suitable flexible polymer. Anti-shock members 230a', 230b' may be in the configuration of elongated blocks (i.e., parallelepipeds) or other suitable shapes disposed on either side of central pin 236. Each anti-shock member is further fitted to the cushion mount 220' via a projection or boss 233 extending from the planar surface of each anti-shock member 230a', 230b'. These bosses 233 are sized to fit snugly into cushion mount grooves 239 formed into the inside planar face of cushion mount lower portion 226 (FIG. 51). Each anti-shock member 230a', 230b' includes lips 231 extending upward and downward from side planar surfaces. These lips 231 wrap substantially around the top and bottom surfaces along three outer sides and edges of anti-shock members 230a', 230b'.

Full assembly of cushion mount 220' includes securing anti-shock members 230a', 230b' into mount lower portion 226 by the bosses 233 fitting into grooves 239, then placing mount upper portion 222 on top of lower portion 226 and cushion mounts 230a', 230b'. The cushion mounts are of equal height so that the edges of upper and lower portions 222, 226 are parallel to each other. The central pin 236 is then placed between upper and lower mount portions 222, 226 along the common central axis to secure upper mount portion 222, anti-shock members 230a', 230b', and lower mount portion 226 together. Bolts or fasteners 232 are inserted through lower mount portion 226 and extend perpendicularly through slots 223 in cylindrical flanges 221 in upper portion 222, and are secured into threaded openings 235 at the opposite ends of pin 236 disposed along the shared central axis of the mount 220'. Lower mount 226 includes concave curved regions 225 that slide along the outer convex surfaces of cylindrical flanges 223 to permit pivoting between the upper and lower mount portions around pin 236.

A slight rocking motion is permitted around pin 236 between upper and lower mount portions 222, 226 after assembly, by alternate expansion and compression of anti-shock members 230a', 230b' on either side of the pin. Lips 231 on one longer side and two shorter sides of each anti-shock member 230a', 230b' fit tightly against the edges of the upper and lower mount portions 222, 226 and help prevent unwanted debris from entering the passageways and other parts of the interior of mount 220' while operating the stunner 10.

The pivoting connection between the upper and lower portions 222, 226 of cushion mount 220' permits the adjustment of the angle of main handle 136 by employing anti-shock members 230a', 230b' that are formed so that the top and bottom side edges of each member 230a', 230b' are angled with respect to each other to create a wedge-type shape. As shown in FIGS. 60 and 61, the wedge shaped anti-shock members 230a', 230b' are of different heights at opposite ends as installed, and have tapered upper and lower surfaces, while still retaining boss 233 on the upper surface and lips 231 extending above and below around three sides. FIGS. 62-66 show anti-shock members formed at angle α (FIG. 63) between upper and lower mount portions 222, 226. Employing these wedged anti-shock members 230a', 230b' in cushion mount 220' allows for a connection between main handle 136 and valve body 166 at the lower end of the stunner housing at any desired angle.

Still another cushion mount embodiment 220" is shown in FIGS. 66-76 for insertion between main handle 136 and valve body 166 of housing 12. In this embodiment, a singular anti-shock member 230" made of a rubber cushion or flexible polymer is disposed between mount upper and lower mount portions 222, 226. First and second portions of the anti-shock member 230" are disposed on either end, which have height and construction similar to the separate anti-shock cushions 230a, 230b of the previous embodiment, but are joined by a shared central portion in the center of the mount 220". Lips 231 again extend substantially around the outside edges of the top and bottom planar surfaces of the first and second portions of the anti-shock member 230", which prevent debris from collecting inside of the mount 220" during operation of the stunner 10. A third portion of the anti-shock member 230" is disposed between and connects the first and second portions, and contains passageways 156c', 158c', 160c' formed therein for connecting the passageways 156a, 158a, 160a of mount upper portion 222 to passageways 156b, 158b, 160b of mount lower portion 226 (FIGS. 66-68). Complete passageways 156, 158, 160 are thus formed once the assembled cushion mount 220" is installed between the main handle 136 and valve body 166 (FIGS. 73-76).

Figure 71:
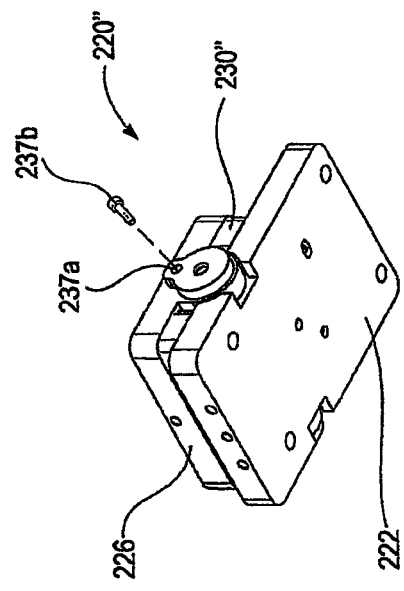
FIG. 71 is a bottom perspective view of the handle mount embodiment of FIG. 66.
Figure 74:
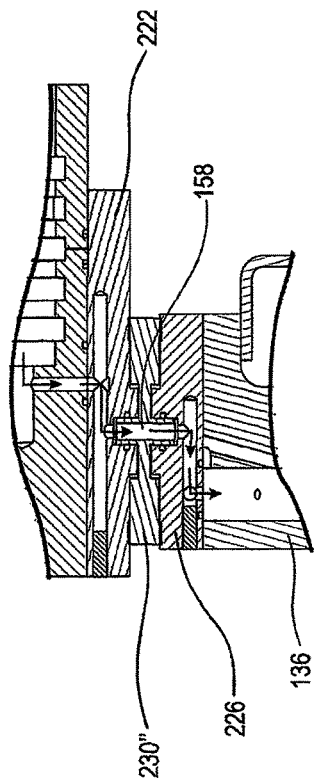
FIG. 74 is a side cutaway view of the handle mount embodiment of FIG. 66 installed on the stunner along lines 74-74 of FIG. 75.
Figure 76:
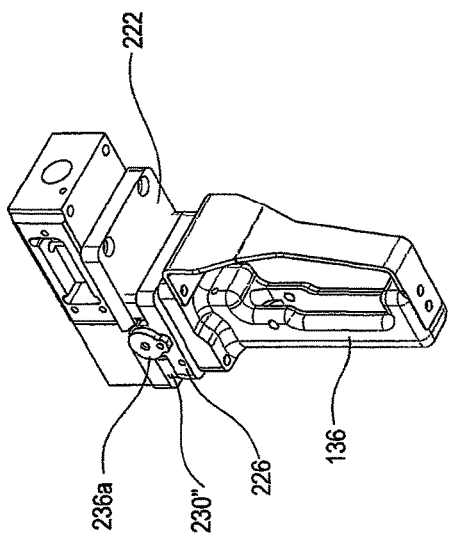
FIG. 76 is a bottom perspective view of the handle mount embodiment of FIG. 66 installed on the stunner.
Figure 73:
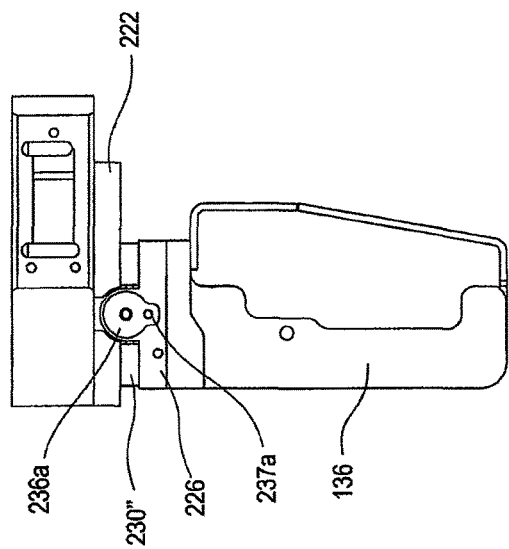
FIG. 73 is a side view of the handle mount embodiment of FIG. 66 installed on the stunner.
Figure 75:
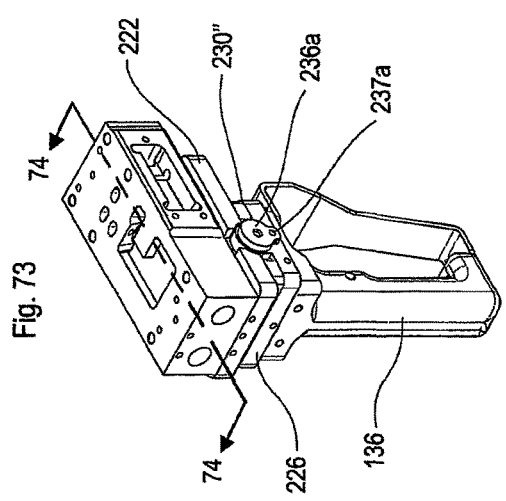
FIG. 75 is a top perspective view of the handle mount embodiment of FIG. 66 installed on the stunner.
Figure 77:
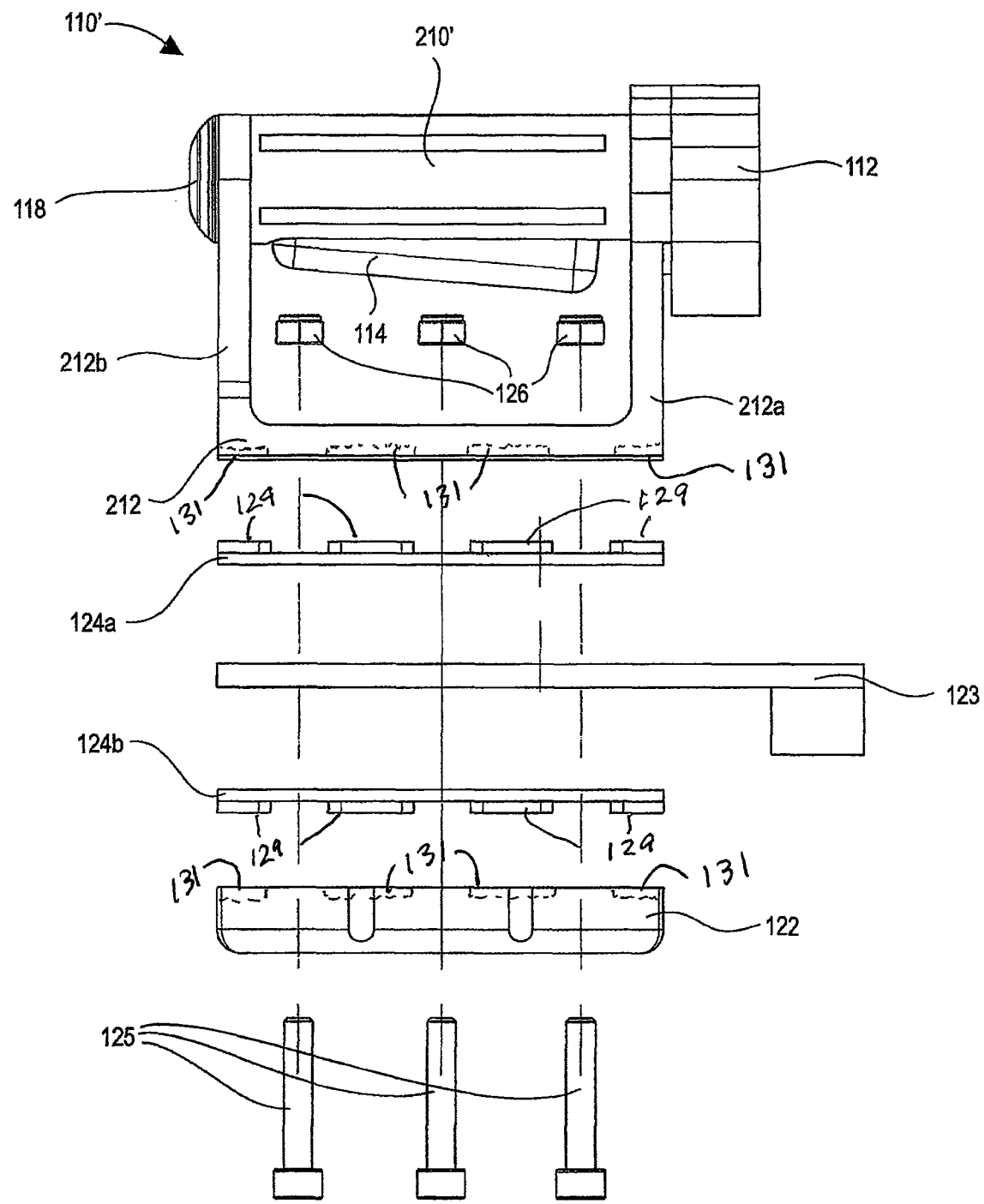
FIG. 77 is side exploded view of an alternate embodiment of the auxiliary handle grip of FIG. 27, employing a re-positionable trigger and anti-shock cushions.

Full assembly of cushion mount 220" includes insertion of anti-shock member 230" between upper and lower mount portions 222 and 226, so that the passageways 156c', 158c', 160c' run along the shared central axis of mount 220". The planar edges of upper and lower mount portions 222, 226 run parallel to each other. Pins 236a, 236b are disposed in the openings of flanges 221' extending from both the lower and upper mount portions on opposite sides of the mount assembly 220" to secure the mount upper portion 222, anti-shock member 230", and mount lower portion 226 together (FIGS. 66-71). Each pin 236a, 236b comprises a flange with a bore 237a for receiving a fastener 237b that extends through the width of the pin 236a, 236b flange into bores 237c in lower mount portion 226 (FIGS. 66 and 71). Fastener 237b secures pins 236a, 236b in position to permit the upper and lower mount portions to pivotally rock against the first and second cushion portions of mount assembly 220". As with the previous embodiment, the first and second portions of anti-shock member 230" may be in the form of wedge-shaped cushions such as those in FIGS. 60 and 61, so that main handle 136 may be secured at a desired angle with respect to housing 12.

An alternate embodiment of a stunning rod useful in the stunner of the present invention is shown in FIGS. 32-48. The alternate embodiment of stunning rod 40' depicted herein may be used in place of stunning rod 40 described previously, and comparable portions of the rod are numbered similarly, but with a prime mark.

Figure 44:
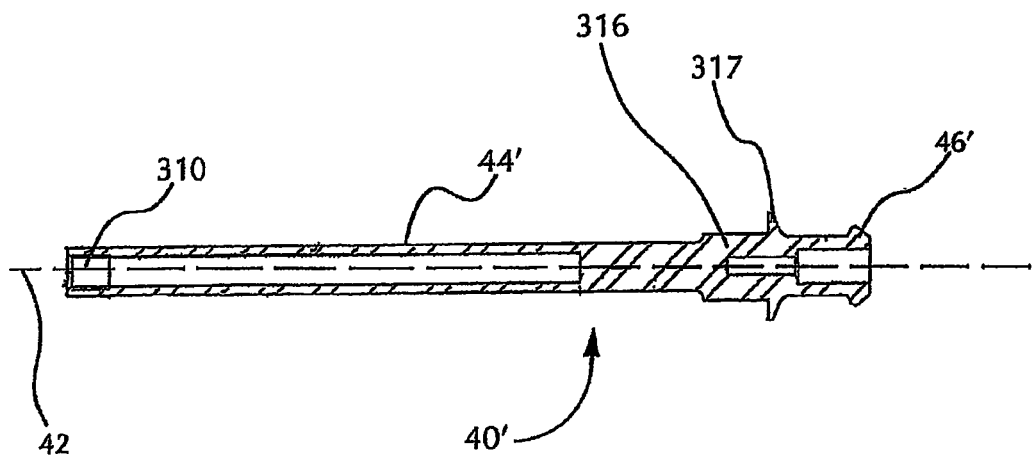
FIG. 44 is a cross-sectional side view of an alternate embodiment of the stunning rod of FIGS. 32-43.
Figure 47:
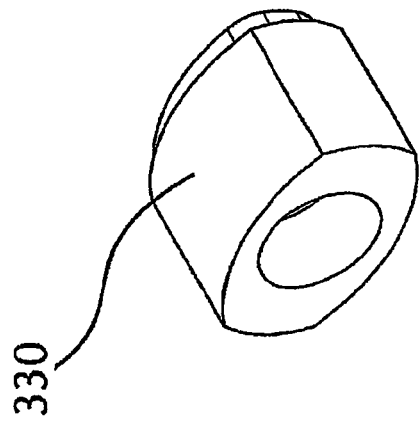
FIG. 47 is a perspective view of the hardened tip of FIG. 46.
Figure 46:
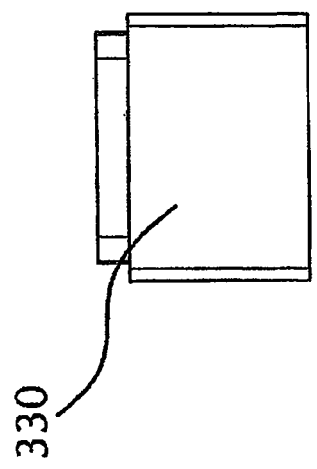
FIG. 46 is a top view of the hardened tip of the alternate embodiment stunning rod of FIG. 37.
Figure 48:
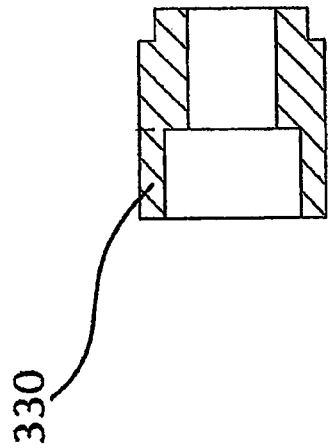
FIG. 48 is a longitudinal cross-sectional view of the hardened tip of FIG. 46.

The stunning rod embodiment shown 40' has an elongated body 44' extending along a longitudinal axis 42' (FIG. 39), with the elongated body 44' having a forward end 310 and an opposite rearward end 312. Body 44' may be solid for all or a portion of its length (FIG. 39) or may be hollow for all or a portion of its length (FIG. 44). The forward end 310 has a lip 311 extending out from the elongated body 44' parallel to the longitudinal axis 42'. The forward end 310 is sized with the same diameter(s) as the stunning rod body for striking (e.g. penetrating) an animal's head. Alternatively, the rod forward end 310 may be sized or may have an attachment (not shown) that has a sufficiently larger diameter to prevent penetration of the animal to be stunned. A hardened tip 330 may also be attached to the forward end 310 of the stunning rod 40', as shown in FIGS. 46-48. The opposite rearward end 312 has formed in (or received as a separate piece as shown in FIGS. 37, 38, and 40) an outwardly extending lip 46' for engagement with a catch 20, as described elsewhere herein.

Figure 45:
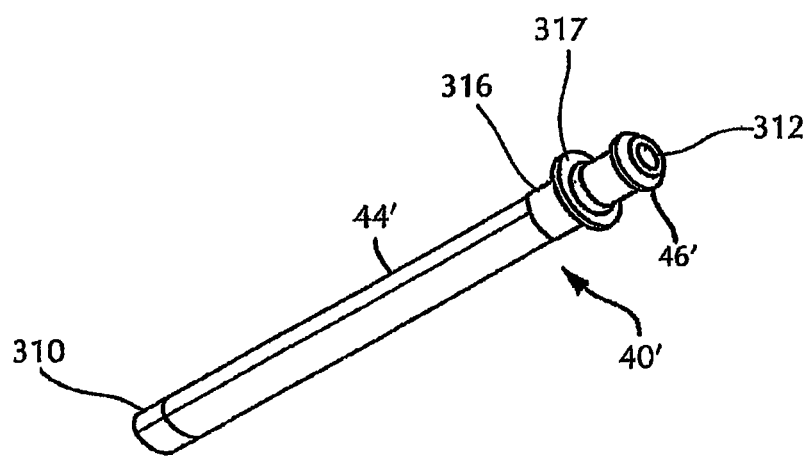
FIG. 45 is a perspective view of the alternate embodiment stunning rod of FIG. 44.

As shown in FIGS. 44 and 45, the stunning rod 40' also has a mounting portion 316 adjacent to the elongated body 44' and located between the forward end 310 and rearward end 312. The mounting portion 316 may have a circular profile for receiving a piston 50'. The mounting portion 316 has a radially outwardly extending flange 317 which is perpendicular to the elongated body 44', as shown in FIG. 44. Referring to FIG. 41, the piston 50' has a cylindrical body with the front and rear surfaces both being flat. The piston 50' has a circular inner bore 52' which is secured to the stunning rod 40'. In particular, the size of the inner bore 52' conforms to the radial measurements of the mounting portion 316, which is also circular in shape. The piston 50' is axially received and rests on mounting portion 316 and is secured against flange 317.

Alternatively, piston 50' may be integrally formed with rod 40' of one piece, as shown in FIG. 39. The elongated body 44' has a circular profile adjacent to the piston 50' portion of the stunning rod 40'. On the forward end 310 facing side of the piston 50', the elongated body 44' flanges out in a semicircular manner where the forward-facing surface of the piston 50' and elongated body 44' integrally meet. The rearward end 312 adjacent piston 50' may receive or have integrally formed therein of one piece a lip 46' (FIG. 40) for engaging the catch.

Referring to FIGS. 32 and 33, all or a portion of the length of body 44' of stunning rod 40' between the piston 50' and forward end 310 is configured to have a first pair of opposite sides 260 each having a first radius R1 and a first diameter D1, and width W1 between them in the Y-direction, and a second pair of opposite sides 270 each having a second radius R2 and a second diameter D2, and width W2 between them in the X-direction. The first radius R1 of the first pair of opposite sides 260 may be different from and larger than the second radius R2 of the second pair of opposite sides 270. The first width W1 between the first pair of sides 260 may be different from and smaller than the second width W2 of the second pair of sides 270. The rod 40' slides in the stunner in a commonly shaped opening in the nose and nose guide of the stunner, discussed further below. The first radius R1 may be any suitable dimension, such as from about 0.500-0.700 inches (1.27-1.778 cm), e.g., 0.600 in. (1.52 cm) and the second radius R2 may be any suitable dimension, such as from about 0.25-0.45 inches (0.635-1.143 cm), e.g. 0.375 in. (0.95 cm). The first width W1 may thus be any suitable dimension, such as from about 0.425-0.625 inches (1.0795-1.5875 cm), and the second width W2 may be any suitable dimension, such as from about 0.65-0.85 inches (1.651-2.159 cm), e.g., 0.750 in. (1.91 cm). Other sizes and dimensions may be employed.

Figure 42:
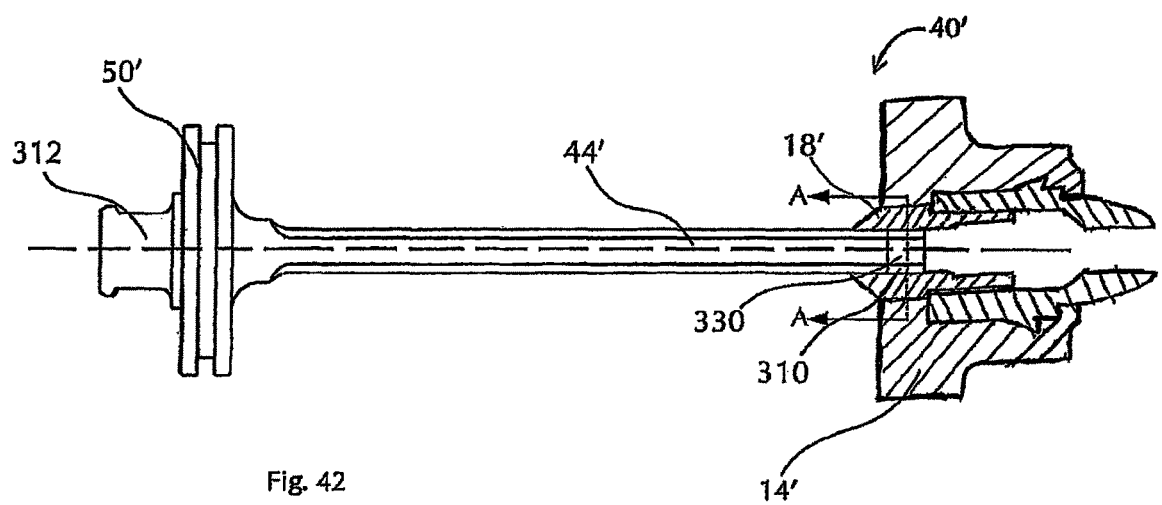
FIG. 42 is a side view of the stunning rod and piston of FIG. 37 with the forward end within the outer housing nose of the stunner of the present invention.
Figure 43:
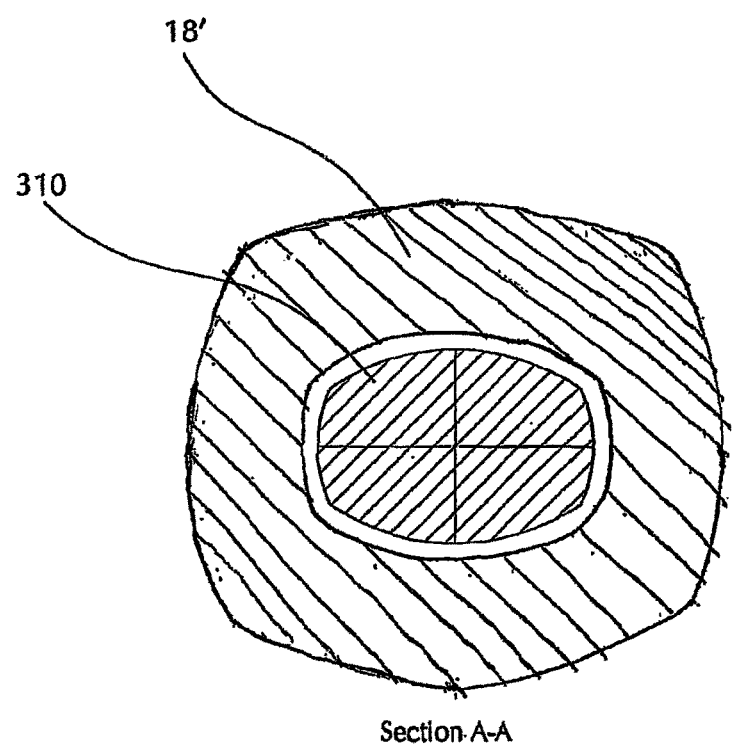
FIG. 43 is a cross-sectional view of the front face of the stunning rod of FIG. 42 within the outer housing nose, along lines A-A.

Referring to FIGS. 42-43, an outer housing nose 14' surrounds the stunning rod 40' and includes a nose guide 18' with an opening through which the stunning rod passes. The bore in the outer housing nose guide 18' is slightly larger than and conforms to the radii R1, R2 and widths W1, W2 (as shown in FIGS. 32 and 33) of the stunning rod 40' so as to permit sliding movement in the longitudinal direction. Unlike the circular cross section of the body 44 of stunning rod 40 described previously, the non-circular configuration of the rod body 44' with different widths in the X- and Y-directions prevents rotational movement of the rod about the longitudinal axis 42' within the nose guide and housing upon firing of the stunner.

Figure 11:
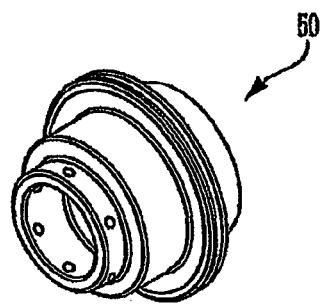
FIG. 11 is a perspective view of the catch piston according to the present invention.
Figure 12:
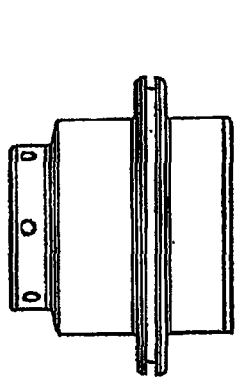
FIG. 12 is a side elevational view of the catch piston shown in FIG. 11.
Figure 13:
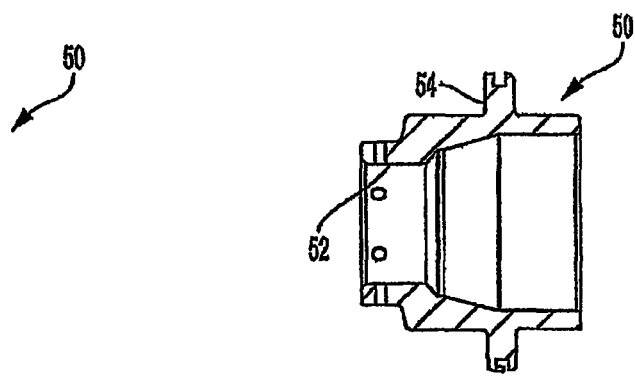
FIG. 13 is a side cross sectional view of the catch piston shown in FIG. 11.
Figure 21:
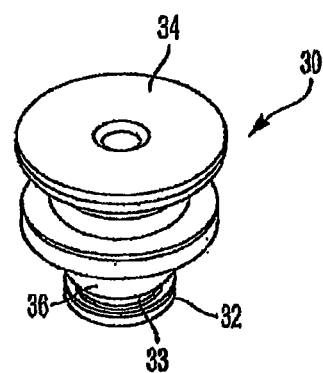
FIG. 21 is a perspective view of the catch support according to the present invention.
Figure 22:
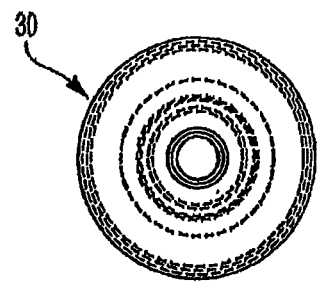
FIG. 22 is a top elevational view of the catch support shown in FIG. 21.
Figure 23:
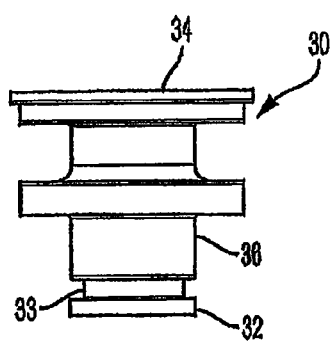
FIG. 23 is a side elevational view of the catch support shown in FIG. 21.
Figure 24:
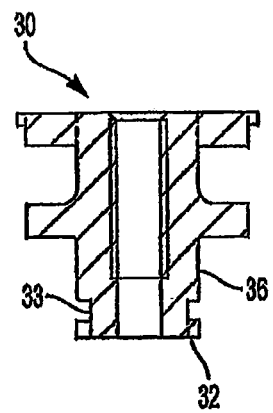
FIG. 24 is a side cross sectional view of the catch support shown in FIG. 21.

The structure and operation of catch 20 with respect to the stunning rod 40 is shown in more detail in FIGS. 7-24. FIGS. 7-10 show the stunning rod 40 comprising an elongated body 44 having a longitudinal axis 42. A stunning rod lip 46 is disposed on one end of the stunning rod 40. FIGS. 11-13 show a catch piston 50 having a smooth inner bore 52 and a catch piston flange 54. The stunning rod 40 is axially disposed on piston 48 within the housing 12 and is capable of being driven forward along the longitudinal axis 42 towards the front end of the housing 12 when pressurized air or other pneumatic fluid enters the chamber, as described above. The stunning rod 40 shown with the forward end sized for striking (e.g. penetrating) the animal's head, but other stunning rod designs and styles may be employed, including those with sufficiently large diameter of the forward end to prevent penetration of the animal being stunned. The alternate embodiment of stunning rod 44' may be employed in place of the embodiment 40 shown in FIGS. 7-24.

Figure 7:
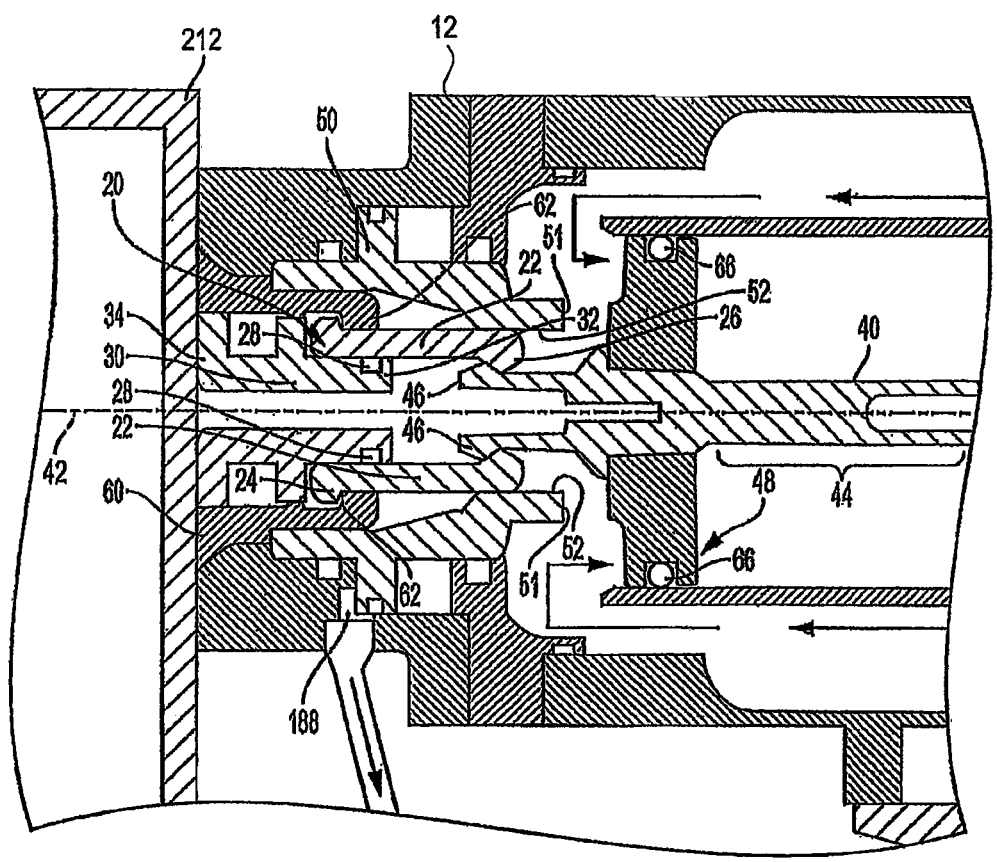
FIG. 7 is an enlarged cross-sectional view of the animal stunner catch system shown in the hold position of FIG. 3.
Figure 8:
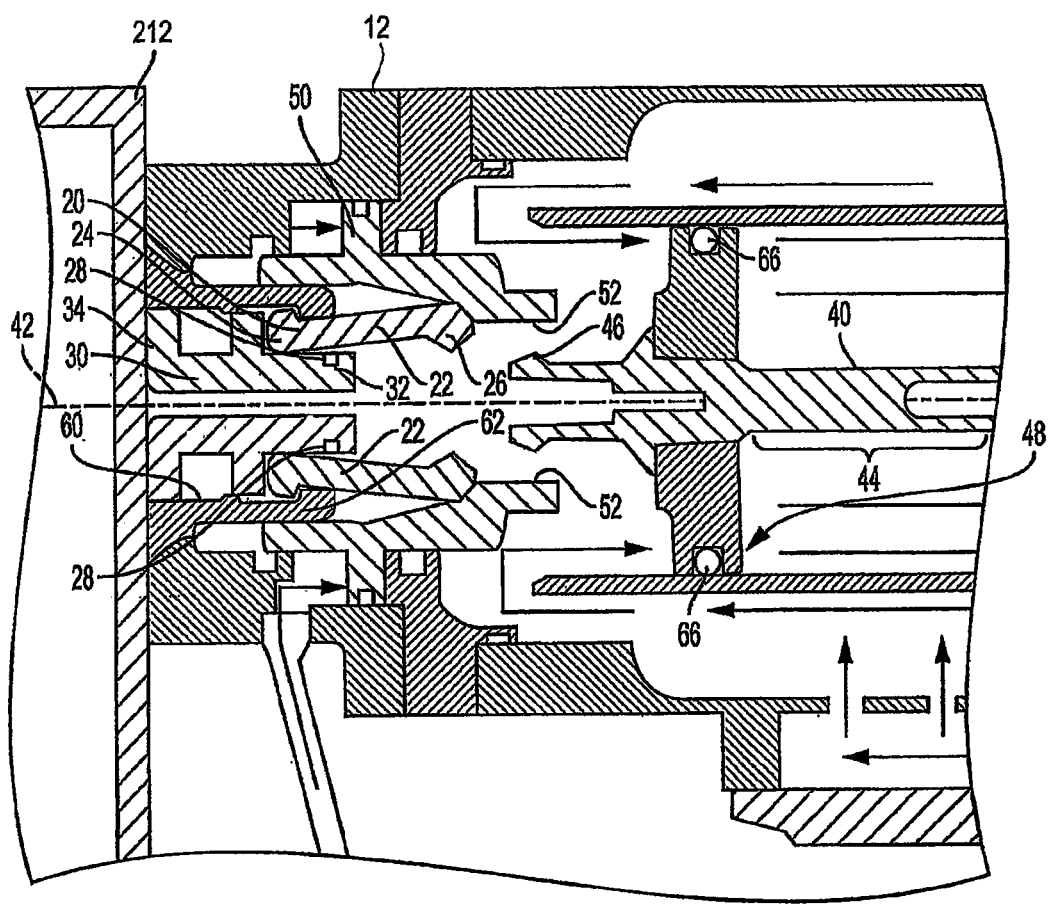
FIG. 8 is an enlarged cross-sectional view of the animal stunner catch system shown in the released position of FIG. 4.
Figure 9:
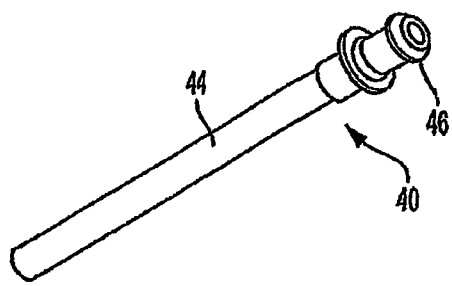
FIG. 9 is a perspective view of one example of the stunning rod according to the present invention.
Figure 10:
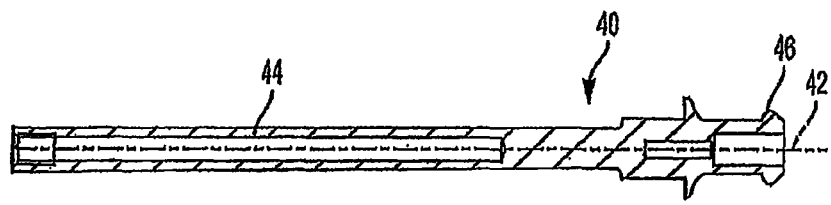
FIG. 10 is a cross sectional view of one example of the stunning rod of FIG. 9.

FIGS. 14-17 show catch 20 having a catch body 22, at the forward end a catch end portion 26 with inward extending lips and near the rearward end an outward extending catch flange 24. Catch 20 is mounted within the housing 12 outside of the stunning rod longitudinal axis 42 for alternately holding and releasing the stunning rod 40. The catches 20 shown in FIGS. 3-8 are two of four arcuate catches that may be arrayed around axis 42 as shown in their hold position FIG. 17 and employed in the example depicted in the drawings. Fewer or more than four catches may be employed. Catch body 22 rotates with respect to a catch pivot or post, shown herein in the form of a catch pivot ring 60 extending around the outer sides of the catch bodies (FIGS. 7 and 8). The catch flange 24 extends outwardly away from axis 42 and is engageable with a catch pivot ring inner lip 62 extending inwardly from the end of the cylindrical body 64 of catch pivot ring 60 shown in FIGS. 18-20.

As shown in FIGS. 7 and 8, catch body portion 22 is pivotally mounted on inner lip 62, between stationary catch pivot ring 60, disposed on a side away from axis 42, and stationary catch support 30 (see also FIGS. 21-24), disposed on a side toward axis 42. The catch support 30 has a cylindrical body portion 36 and includes a circular support head 34 disposed adjacent the back portion of the housing 12 and a circular catch support distal end 32 which is disposed within the four arcuate catches 20. An external groove 33 is disposed in and around the outside of body 36 adjacent end 32 to receive an optional O-ring (discussed further below). The catch body portion 22 is disposed on an outward side of catch support 30 away from the stunning rod longitudinal axis 42. The catch 20 includes the end portion 26 extending from the body portion 22 toward the housing front end 14 and distal from the catch support 30. Since the example employs a plurality (four) catches arrayed about longitudinal axis 42, each catch 20 is constructed and held between catch pivot ring 60 and catch support 30 so that their ends 26 are normally extended away from each other and axis 42. The catch end portion 26 is movable by catch piston 50 to a hold position toward the longitudinal axis 42, where it engages stunning rod lip 46 preventing the stunning rod 40 from being driven forward. In the hold position catch body 22 is in contact with both the stationary catch pivot ring 60 and the stationary catch support distal end 32.

When catch piston 50 is longitudinally moved forward (FIG. 8), as will be described further below, the constraint placed on catch end portion 26 is removed, and the end portion 26 moves outward to a release position away from stunning rod lip 46 and the stunning rod longitudinal axis 42 permitting the stunning rod 40 to be driven forward. Outward movement of catch end portion 26 is caused by sliding movement of the angle or taper between the forward portion of stunning rod lip 46 and the rearward portion of the inward facing lip of catch end portion 26, as stunning rod 40 moves longitudinally forward. Catch end portion 26 may optionally be assisted in being urged to spring outward by an optional catch tension O-ring or elastic member 28 wrapped around the body 36 of the catch support 30, in groove 33. When in the hold position (FIG. 7, O-ring or elastic member 28 is compressed by catch body 22, so that when catch piston 50 moves forward, member 28 expands, thereby urging the catch body 22 and end 26 away from axis 42, which assist then reduces wear on the outer forward tapered surface of stunning rod lip 46. In this catch end portion release position away from axis 42, catch body 22 is in contact with the stationary catch pivot ring 60 and out of contact with the stationary catch support distal end 32. The catch flange 24 is engaged with the catch pivot ring inner lip 62, allowing the catch flange 24 to be held pivotally between the catch pivot ring inner lip 62 and the catch support cylindrical body portion 36 (FIGS. 21, 23, 24), allowing the catch 20 to pivot about the catch flange as shown in FIG. 8.

The catch 20 may be an arcuate section of a cylinder having an inner catch end portion 26 and an outer flange 24. The catch 20 shown in FIG. 16 has an arc of less than 90° as shown in FIG. 17 so that four catches 20 may be arranged cylindrically about the longitudinal axis 42 and within the catch pivot ring 60 with sufficient space between the catches 20 for the catches 20 to pivot on the catch pivot ring inner lip 62 without interfering with one another. The four catches 20 are supported from collapsing on one another by the catch support 30.

The catch piston 50 is disposed adjacent the catch end portion 26 on a catch side away from the longitudinal axis. The catch piston 50 is in sliding contact with the catch 20 adjacent the catch end portion 26 and out of contact with the catch body portion 22. The catch piston 50 is adapted to slide in the directions of the longitudinal axis 42 between a first, rearward position, shown in FIG. 3, urging the catch end portion 26 toward the stunning rod lip 46 longitudinal axis 42 in the hold position, thereby holding and preventing the stunning rod 40 from being driven forward, and a second, forward position, shown in FIG. 4, permitting the catch end portion 26 to move to the release position away from the stunning rod lip 46 longitudinal axis 42, releasing and permitting the stunning rod 40 to be driven forward.

As described above in connection with FIG. 6, at the end of the firing sequence piston 48 reverses direction in chamber 180, and moves rearward to strike the forward end 51 of catch piston 50, to move it rearward and force catches 20 inward, as shown in FIG. 7. In the closed or locked position, the catch end portion 26 is fully engaged with the stunning rod lip 46, holding the stunning rod 40 from moving forward. The catch 20 is held in the fully engaged position by the catch piston inner bore 52. In operation, as the firing sequence commences, the pneumatic pressure in chamber 188 moves the catch piston 50 forward (rightward) toward the housing front end 14. Once the inner bore 52 moves forward past the catch end portion 26, as shown in FIG. 8, the catch 20 pivots about the catch pivot ring inner lip 62 wherein each catch end portion 26 moves outward from the cylindrical orientation, disengaging the catch end portion 26 and the stunning rod lip 46. In the disengaged position, the catch body portion 22 is not in contact with the catch piston 50 or the stationary catch support distal end 32. The force of pressurized air drives piston 48 forward and stunning rod 40 moves along the stunning rod longitudinal axis 42 toward the housing front end 14 from the force of the pressurized air or other pneumatic fluid.

The present invention therefore provides an improved animal stunner having one or more of the following advantages. The stunning rod slides easily and reliably without rotation, and the stunning rod release system reduces wear of the moving parts controlling the operation of the animal stunner. The animal stunner has reduced drag on movement between the catch and catch piston during operation, and reduced wear on the catch and catch piston as a result of repeated operation. The catch system for the stunning rod is stronger and requires less replacement over extended periods of heavy operation, thus improving operator safety and animal stunning effectiveness. The stunner of the present invention uses less compressed air between each stunner cycle because of the ability to pre-supply piston return air in the return chamber during the initial pressurizing cycle. Additionally, the improvements to handle design, orientation and mounting provides improved operator comfort and reduction of possible injury.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A stunner for stunning an animal comprising:
a housing having a stunning rod therein capable of being driven along a longitudinal axis forward to stun an animal and rearward to retract the stunning rod;
a handle having a valve trigger to control flow of pressurized fluid to drive the stunning rod forward;
a mount between the handle and the housing, the mount having a first portion connected to the housing, a second portion connected to the handle, the first and second mount portions each having opposite edges, the edges of the first mount portion being spaced from the edges of the second mount portion, the first and second mount portions being secured to each other between the opposite edges; and
at least one cushion disposed between the first and second mount portions, the cushion having opposite sides to seal the space between the first and second mount portions.

2. The stunner of claim 1 wherein the at least one cushion has a first portion with an edge sealing the space between one of the opposite edge portions of the first and second mount portion, and the cushion has a second portion with an edge sealing the space between the other of the opposite edge portions of the first and second mount portions.

3. The stunner of claim 2 wherein each of the housing and handle have at least one passageway for the pressurized fluid to drive the stunning rod, and wherein each of the first and second mount portions contain at least one passageway connecting the housing and handle passageways proximate to the location at which the first and second mounts are secured to each other.

4. The stunner of claim 3 wherein the cushion is a single piece, and further includes a third portion connecting the first and second cushion portions, the third portion further including at least one passageway for connecting the housing and handle passageways.

5. The stunner of claim 3 wherein the mounts are secured along an axis to permit a pivoting motion between the first and second mount portions, and further including a pin along the axis wherein the pin includes at least one passageway for connecting the housing and handle passageways.

6. The stunner of claim 2 wherein the first and second cushion portions are separate pieces.

7. The stunner of claim 2 wherein the cushion is a single piece, and further includes a third portion connecting the first and second cushion portions.

8. The stunner of claim 2 wherein the first and second cushion portions have first and second sides, and the thickness of the first sides of the first and second cushions are different from the thickness of the second sides of the first and second cushions.

9. The stunner of claim 1 wherein the mounts are secured along an axis to permit a pivoting motion between the first and second mount portions.

10. A mount for connecting a housing to a handle of an animal stunner, the housing having a stunning rod therein capable of being driven along a longitudinal axis forward to stun an animal and rearward to retract the stunning rod, the handle having a valve trigger to control flow of a pressurized fluid to drive the stunning rod forward, each of the housing and handle having at least one passageway for the pressurized fluid to drive the stunning rod, the mount comprising:
a first mount portion for connection to the housing;
a second mount portion for connection to the handle;
wherein the first and second mount portions each have opposite edges, the edges of the first mount portion being spaced from the edges of the second mount portion, the first and second mount portions being secured to each other between the opposite edges; and wherein each of the first and second mount portions contain at least one passageway for connecting the housing and handle passageways proximate to the location at which the first and second mount portions are secured to each other.

11. The mount of claim 10 wherein the first mount portion and second mount portion are secured to each other along an axis to permit a pivoting motion between the first and second mount portions.

12. The mount of claim 11 further including a pin along the axis wherein the pin includes at least one passageway for connecting the housing and handle passageways.

13. The mount of claim 11 further including at least one pin along the axis where the first and second mount portions are secured.

14. The mount of claim 10 wherein the spacing between the first edges of the first mount portion and second mount portion is not equal to the spacing between the second edges of the first mount portion and second mount portion.

15. The mount of claim 10 wherein at least one cushion is disposed between the mount first and second portions.

16. The mount of claim 15 wherein the at least one cushion has a first portion with an edge sealing the space between one of the opposite edge portions of the first and second mount portion, and the cushion has a second portion with an edge sealing the space between the other of the opposite edge portions of the first and second mount portions.

17. The mount of claim 16 wherein the first and second cushion portions are separate pieces.

18. The mount of claim 16 wherein the cushion is a single piece, and further includes a third portion connecting the first and second cushion portions.

19. The mount of claim 16 wherein the cushion is a single piece, and further includes a third portion connecting the first and second cushion portions, the third portion further including at least one passageway for connecting the housing and handle passageways.

20. An anti-shock cushion for absorbing vibration and shock transmitted from a housing to a handle of an animal stunner, the handle having a valve and a valve trigger to control flow of the pressurized fluid to the stunner and a mount between the handle and the housing, the mount having a first portion connected to the housing, a second portion connected to the handle, the first and second mount portions each having opposite edges, the edges of the first mount portion being spaced from the edges of the second mount portion, the first and second mount portions being secured to each other between the opposite edges, the cushion being disposed between the first and second mount portions and having a boss extending therefrom received in an opening in one of the mount portions, the cushion having lips extending upward and downward on three sides thereof to seal the space between the first and second mount portions.

21. A stunner for stunning an animal comprising:
a housing having a stunning rod therein capable of being driven along a longitudinal axis forward to stun an animal and rearward to retract the stunning rod;
a first handle having a valve and a first moveable valve trigger to control flow of pressurized fluid to drive the stunning rod forward;
a second handle having a valve and a second moveable valve trigger to control flow of the pressurized fluid, the valves of the first and second handles being connected by passageways such that the both of the first and second valve triggers must be depressed to provide pressurized fluid to drive the stunning rod forward; and
a bracket extending from the housing on which is mounted the second handle and the second moveable valve trigger extending outward from a side of the second handle, the second handle being rotatable within the bracket and fixed in place in one of a plurality of positions, wherein the second moveable valve trigger may positioned to extend from the second handle and be operable at a plurality of different fixed positions relative to the housing.

22. The stunner of claim 21 wherein the housing has a front end from which the stunning rod projects forward to stun the animal, a rear end opposite the front end, and sides between the front and rear ends, and wherein the first handle is a main handle extending from a side of the housing and the second handle is an auxiliary handle extending from the rear end of the housing, the handle being oriented substantially perpendicular to the longitudinal axis.

23. The stunner of claim 21 wherein one of the bracket and the second handle has a projection and the other of the bracket and the second handle has an opening for receiving the projection, the projection being removable from the opening to permit the second handle to rotate relative to the bracket to the plurality of positions, and the projection being replaceable within the opening to fix the second handle in place in one of the plurality of positions.

24. The stunner of claim 23 wherein the projection comprises a spline at an end of the second handle and the opening comprises grooves in the bracket for receiving the spline, the second handle being slideable with respect to the bracket to disengage the spline from the bracket grooves to permit the second handle to rotate, and the splines being re-engageable within the grooves to fix the second handle in place.

25. The stunner of claim 24 wherein the valve of the second handle is disposed on the bracket at an end of the second handle opposite the spline, the second handle valve being removable from the bracket to permit the spline to be disengaged from the bracket grooves and replaceable on the bracket when the splines are re-engageable within the grooves to fix the second handle in place.

26. A stunner for stunning an animal comprising:
a housing having a stunning rod therein capable of being driven along a longitudinal axis forward to stun an animal and rearward to retract the stunning rod;
a first handle having a valve and a first moveable valve trigger to control flow of pressurized fluid to drive the stunning rod forward;
a second handle having a valve and a second moveable valve trigger to control flow of the pressurized fluid, the valves of the first and second handles being connected by passageways such that the both of the first and second valve triggers must be depressed to provide pressurized fluid to drive the stunning rod forward, the second handle being disposed on a second handle bracket;
a mounting bracket extending from the housing on which is mounted the second handle bracket; and
a first anti-shock cushion disposed between the second mounting bracket and the second handle bracket.

27. The stunner of claim 26 wherein the first anti-shock cushion includes a plurality of bosses extending therefrom, and the second handle bracket includes openings for receiving the bosses.

28. The stunner of claim 27 further including an end cap secured to the mounting bracket on a side opposite the second handle bracket, and a second anti-shock cushion disposed between the mounting bracket and the end cap.

29. An anti-shock cushion for absorbing vibration and shock transmitted from a housing to a handle of an animal stunner, the handle having a valve and a valve trigger to control flow of the pressurized fluid to the stunner, the handle being disposed on a handle bracket mounted on a mounting bracket extending from the housing, the cushion being elongated and disposed between the mounting bracket and the handle bracket, the cushion including a plurality of spaced bosses extending therefrom along the length of the cushion and received in openings in the handle bracket.

30. The anti-shock cushion of claim 29 wherein the bosses have concave sides facing each other and the cushions have openings between the bosses for receiving bolts to connect the mounting bracket and the handle bracket.

31. A method of operating an animal stunner comprising:
providing a stunner having a housing with a stunning rod therein capable of being driven along a longitudinal axis forward to stun an animal and rearward to retract the stunning rod; a first handle having a valve and a first moveable valve trigger to control flow of pressurized fluid to drive forward and retract the stunning rod; a second handle having a valve and a second moveable valve trigger to control flow of the pressurized fluid, the valves of the first and second handles being connected by passageways such that the both of the first and second valve triggers must be depressed to provide pressurized fluid to drive the stunning rod forward; and a bracket extending from the housing on which is mounted the second handle and the second moveable valve trigger extending outward from a side of the second handle, the handle being rotatable within the bracket and fixed in place in a first position, wherein the second trigger extends from the second handle and is operable at a first fixed position relative to the housing;
rotating the second handle being within the bracket to a second position different from the first position; and
fixing the second handle in place in the second position, wherein the second trigger extends from the second handle and is operable at a second fixed position different from the first fixed position relative to the housing.

32. The method of claim 31 wherein one of the bracket and the second handle has a projection and the other of the bracket and the second handle has an opening receiving the projection, and including, prior to rotating the second handle, removing the projection from the opening to permit the second handle to rotate relative to the bracket; and further including, after rotating the second handle to the second position, replacing the projection within the opening to fix the second handle in place in the second position.

33. The method of claim 32 wherein the projection comprises a spline at an end of the second handle and the opening comprises grooves in the bracket for receiving the spline, including, prior to rotating the second handle, sliding the second handle with respect to the bracket to disengage the spline from the bracket grooves to permit the second handle to rotate; and further including, after rotating the second handle relative to the bracket to the second position, sliding the handle with respect to the bracket to re-engage the spline within the bracket grooves to fix the second handle in place in the second position.

34. The method of claim 33 wherein the valve of the second handle is disposed on the bracket at an end of the second handle opposite the spline, and including removing the second handle valve from the bracket to permit the spline to be disengaged from the bracket grooves, and further including, after re-engaging the splines within the bracket grooves to fix the second handle in place, and replacing the valve on the bracket.

* * * * *